United States Patent
Song et al.

(10) Patent No.: US 12,501,385 B2
(45) Date of Patent: Dec. 16, 2025

(54) APPARATUS AND METHOD FOR CONTROLLING E2 NODE IN WIRELESS COMMUNICATION SYSTEM

(71) Applicant: Samsung Electronics Co., Ltd., Suwon-si (KR)

(72) Inventors: Junhyuk Song, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 18/149,979

(22) Filed: Jan. 4, 2023

(65) Prior Publication Data
US 2023/0133083 A1    May 4, 2023

Related U.S. Application Data

(63) Continuation of application No. PCT/KR2022/005457, filed on Apr. 15, 2022.

(30) Foreign Application Priority Data

Apr. 16, 2021    (KR) .......................... 10-2021-0050167

(51) Int. Cl.
*H04W 60/00* (2009.01)
*H04W 8/20* (2009.01)
*H04W 92/12* (2009.01)

(52) U.S. Cl.
CPC ............. *H04W 60/00* (2013.01); *H04W 8/20* (2013.01); *H04W 92/12* (2013.01)

(58) Field of Classification Search
CPC ......... H04W 8/20; H04W 4/60; H04W 88/12; H04W 88/085; H04W 92/12;
(Continued)

(56) References Cited

U.S. PATENT DOCUMENTS

| | | | |
|---|---|---|---|
| 12,107,728 B2 * | 10/2024 | Yeh | ..................... H04L 41/5025 |
| 2016/0050601 A1 * | 2/2016 | Jeong | .................. H04W 36/142 |
| | | | 455/436 |

(Continued)

FOREIGN PATENT DOCUMENTS

| | | |
|---|---|---|
| CN | 111510959 A | 8/2020 |
| CN | 111642011 A | 9/2020 |

(Continued)

OTHER PUBLICATIONS

International Search Report dated Jul. 25, 2022, issued in International Patent Application No. PCT/KR2022/005457.
(Continued)

*Primary Examiner* — David Q Nguyen
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by an E2 node is provided. The method includes receiving a subscription request message from a radio access network (RAN) intelligent controller (RIC), transmitting a subscription response message to the RIC, and when an event occurs in response to the subscription response message, transmitting a RIC indication message to the RIC, and the RIC indication message may include a user equipment (UE) identifier (ID) which is managed at a higher node associated with the E2 node.

20 Claims, 42 Drawing Sheets

(58) Field of Classification Search
CPC ....... H04W 92/24; H04W 76/11; H04W 8/28; H04W 24/08; H04W 8/26; H04W 8/22; H04W 84/047; H04W 92/14
USPC ............... 370/328, 329, 330, 331; 455/435.1
See application file for complete search history.

(56) References Cited

U.S. PATENT DOCUMENTS

| | | | |
|---|---|---|---|
| 2020/0314826 A1 | 10/2020 | Sharma et al. | |
| 2021/0014912 A1* | 1/2021 | Song | H04W 8/08 |
| 2022/0014903 A1* | 1/2022 | Chandrashekar | H04W 76/11 |
| 2022/0225066 A1 | 7/2022 | Song et al. | |
| 2022/0225264 A1 | 7/2022 | Song et al. | |
| 2022/0232508 A1 | 7/2022 | Song et al. | |
| 2023/0110387 A1* | 4/2023 | Urie | H04W 8/186 |
| | | | 455/418 |
| 2023/0171592 A1* | 6/2023 | Han | H04W 8/20 |
| | | | 370/328 |

FOREIGN PATENT DOCUMENTS

| | | |
|---|---|---|
| CN | 111654877 A | 9/2020 |
| CN | 111565418 B | 12/2020 |
| EP | 4221378 A1 | 8/2023 |
| KR | 10-2021-0039311 A | 4/2021 |
| WO | 2020/156053 A1 | 8/2020 |
| WO | 2020/242987 A1 | 12/2020 |
| WO | 2021/066587 A1 | 4/2021 |
| WO | 2021/066588 A1 | 4/2021 |
| WO | 2021/071324 A1 | 4/2021 |

OTHER PUBLICATIONS

Extended European Search Report dated Jul. 8, 2024, issued in European Patent Application No. 22788495.4.
AT&T; Traffic Steering xApp and Data Design—Bronze Release; O-RAN Software Community RIC Applications; Mar. 26, 2020.
O-RAN Working Group 3; Near-Real-time RAN Intelligent Controller (Near-RT RIC) E2 Service Model (E2SM); Ran Function Network Interface (NI); ORAN-WG3.E2SM-NI-v01.00.00; Jan. 29, 2020.
O-RAN Working Group 3; Near-Real-time RAN Intelligent Controller (Near-RT RIC); E2 Application Protocol (E2AP); ORAN-WG3.E2AP-v01.00.00; Jan. 28, 2020.

* cited by examiner

| IE/Group Name | Presence | Range | IE type and reference | Semantics description |
|---|---|---|---|---|
| CHOICE E2 Node Type | M | | | |
| >gNB/ng-eNB | | | | |
| >>AMF UE NGAP ID | C | | INTEGER | 3GPP 38.413 [] clause 9.3.3.1<br>Conditionally absent for Secondary Node (or Slave Node) when DC is established over Xn I/F. |
| >>GUAMI | C | | OCTET STRING | 3GPP 38.413 [] clause 9.3.3.3<br>Conditionally absent for Secondary Node (or Slave Node) when DC is established over Xn I/F. |
| >>M-NG-RAN node UE XnAP ID | C | | INTEGER | Conditionally present whe DC is established. To be reported by both MN and SN 3GPP 38.423 [] clause 9.3.1.4 |
| >>Global gNB ID | C | | OCTET STRING | Conditionally present whe DC is established. To be reported by both MN and SN 3GPP 38.423 [] clause 9.3.2.3 |
| >gNB-CU-CP | | | | |
| >>AMF UE NGAP ID | C | | INTEGER | 3GPP 38.413 [] clause 9.3.3.1<br>Conditionally absent for Secondary Node (or Slave Node) when DC is established over Xn I/F. |
| >>GUAMI | C | | OCTET STRING | 3GPP 38.413 [] clause 9.3.3.3<br>Conditionally absent for Secondary Node (or Slave Node) when DC is established over Xn I/F. |
| >>gNB-CU UE F1AP ID  List | | 1 | | More than 1 F1AP ID Shall be reported only when NR-DC is established Xn I/F. (However if NR-DC is established over Xn I/F, F1AP ID for can be available -> we can remove this comment at all) |
| >>>gNB-CU UE F1AP ID  Item | | 1...max F1APId | | |
| >>>> gNB-CU UE F1AP ID | M | | INTEGER | 3GPP 38.473 [] clause 9.3.1.4 |
| >>gNB-CU UE E1AP ID  List | | 1 | | |
| >>>gNB-CU UE E1AP ID  Item | | 1...max E1APId | | |
| >>>>gNB-CU-CP UE E1AP ID | M | | INTEGER | 3GPP 38.463 [] clause 9.3.1.4 |
| >>RAN UE ID | O | | OCTET STRING | 3GPP 38.473 [] clause 9.2.2.1 |
| >>M-NG-RAN node UE XnAP ID | C | | INTEGER | Conditionally present when DC is established. To be reported by both MN and SN 3GPP 38.423[] clause 9.3.1.4 |
| >>Global gNB ID | C | | OCTET STRING | Conditionally present when DC is established. To be reported by both MN and SN 3GPP 38.423[] clause 9.2.2.3 |
| >gNB-CU | | | | |
| >>AMF UE NGAP ID | C | | INTEGER | 3GPP 38.413 [] clause 9.3.3.1<br>Conditionally absent for Secondary Node (or Slave Node) when DC is established over XnI/F/ |
| >>GUAMI | C | | OCTET STRING | 3GPP 38.413 [] clause 9.3.3.3<br>Conditionally absent for Secondary Node (or Slave Node) when DC is established over XnI/F/ |
| >>ng-eNB CU UE W1AP ID | M | | INTEGER | 3GPP 37.473 [] clause 9.3.1.4 |
| >>M-NG-RAN node UE XnAP ID | C | | INTEGER | Conditionally present when DC is established. To be reported by both MN and SN 3GPP 38.423[] clause 9.2.2.3 |
| >>Global gNB ID | C | | OCTET STRING | Conditionally present when DC is established. To be reported only by SN 3GPP 38.423[] clause 9.2.2.3 |

FIG.17AX

| IE/Group Name | Presence | Range | | Semantics description |
|---|---|---|---|---|
| >ng-eNB DU | | | | |
| >>ng-eNB-CU UE W1AP ID | M | | INTEGER | 3GPP 37.473 [] clause 9.3.1.4 |
| >en-gNB | | | | |
| >>MeNB UE X2AP ID | M | | INTEGER | 3GPP 36.423 [] clause 9.3.1.4 |
| >>Global eNB ID | M | | OCTET STRING | 3GPP 36.423 [] clause 9.2.22 |
| >en-gNB-CU | | | | |
| >>MeNB UE X2AP ID | M | | INTEGER | 3GPP 36.423 [] clause 9.3.1.4 |
| >>Global eNB ID | M | | OCTET STRING | 3GPP 36.423 [] clause 9.2.22 |
| >>gNB-CU UE F1AP ID | M | | INTEGER | 3GPP 37.473 [] clause 9.3.1.4 |
| >>RAN UE ID | O | | OCTET STRING | 3GPP 38.473 [] clause 9.2.2.1 |
| >en-gNB-CU-CP | | | | |
| >>MeNB UE X2AP ID | M | | INTEGER | 3GPP 36.423 [] clause 9.3.1.4 |
| >>Global eNB ID | M | | OCTET STRING | 3GPP 37.423 [] clause 9.3.22 |
| >>gNB-CU UE F1AP ID | M | | INTEGER | 3GPP 38.473 [] clause 9.3.1.4 |
| >>gNB-CU UE E1AP ID List | | 1 | | |
| >>gNB-CU UE E1AP ID Item | | 1...max E1APId | | |
| >>>>gNB-CU-CP UE E1AP ID | M | | INTEGER | 3GPP 38.463 [] clause 9.3.1.4 |
| >>RAN UE ID | O | | OCTET STRING | 3GPP 38.473 [] clause 9.2.2.1 |
| >en-gNB-DU | | | | |
| >>gNB-CU UE F1AP ID | M | | INTEGER | 3GPP 38.473 [] clause 9.3.1.4 |
| >>RAN UE ID | O | | OCTET STRING | 3GPP 38.473 [] clause 9.2.2.1 |
| >en-gNB-CU-UP | | | | |
| >>gNB-CU-CP UE E1AP ID | M | | INTEGER | 3GPP 38.463 [] clause 9.3.1.4 |
| >>RAN UE ID | O | | OCTET STRING | 3GPP 38.473 [] clause 9.2.2.1 |
| >eNB | | | | |
| >>MME UE S1AP ID | M | | INTEGER | 3GPP 36.413 [] clause 9.2.3.3 |
| >>GUMMEI | M | | OCTET STRING | 3GPP 36.413 [] clause 9.2.3.9 |
| >>MeNB UE X2AP ID | C | | INTEGER | Conditionally present when DC is established. To be reported by both MN and SN 3GPP 36.423[] clause 9.3.1.4 |
| >>Global eNB ID | C | | OCTET STRING | Conditionally present when DC is established. To be reported only by SN 3GPP 36.423[] clause 9.2.22 |

FIG.17AY

| IE/Group Name | Presence | Range | IE type and reference | Semantics description |
|---|---|---|---|---|
| CHOICE E2 Node Type | M | | | |
| >gNB/ng-eNB | | | | |
| >>AMF UE NGAP ID | C | | INTEGER | 3GPP 38.413 [] clause 9.3.3.1<br>Conditionally absent for Secondary Node (or Slave Node) when DC is established over Xn I/F. |
| >>M-NG-RAN node UE XnAP ID | C | | INTEGER | Conditionally present for Secondary Node (or Slave Node) when DC is established.<br>3GPP 38.423 [] clause 9.3.1.4 |
| >>Global gNB ID | C | | OCTET STRING | Conditionally present for Secondary Node (or Slave Node) when DC is established.<br>3GPP 38.423 [] clause 9.2.2.3 |
| >>RAN UE ID | O | | OCTET STRING | 3GPP 38.473 [] clause 9.2.2.1 |
| >gNB-CU-CP | | | | |
| >>AMF UE NGAP ID | C | | INTEGER | 3GPP 38.413 [] clause 9.3.3.1<br>Conditionally absent for Secondary Node (or Slave Node) when DC is established over Xn I/F. |
| >>M-NG-RAN node UE XnAP ID | C | | INTEGER | Conditionally present for Secondary Node (or Slave Node) when DC is established.<br>3GPP 38.423 [] clause 9.3.1.4 |
| >>Global gNB ID | C | | OCTET STRING | Conditionally present for Secondary Node (or Slave Node) when DC is established. To be reported only by SN<br>3GPP 38.423 [] clause 9.2.2.3 |
| >>RAN UE ID | O | | OCTET STRING | 3GPP 38.473 [] clause 9.2.2.1 |
| >gNB-CU | | | | |
| >>AMF UE NGAP ID | C | | INTEGER | 3GPP 38.413 [] clause 9.3.3.1<br>Conditionally absent for Secondary Node (or Slave Node) when DC is established over Xn I/F. |
| >>M-NG-RAN node UE XnAP ID | C | | INTEGER | Conditionally present for Secondary Node (or Slave Node) when DC is established.<br>3GPP 38.423 [] clause 9.3.1.4 |
| >>Global gNB ID | C | | OCTET STRING | Conditionally present for Secondary Node (or Slave Node) when DC is established. To be reported only by SN<br>3GPP 38.423 [] clause 9.2.2.3 |
| >>RAN UE ID | O | | OCTET STRING | 3GPP 38.473 [] clause 9.2.2.1 |

FIG.17BX

| IE/Group Name | Presence | Range | IE type and reference | Semantics description |
|---|---|---|---|---|
| >gNB-DU | O | | | |
| >>RAN UE ID | M | | INTEGER | 3GPP 38.473 [] clause 9.3.1.4 |
| >>RAN UE ID | O | | OCTET STRING | 3GPP 38.473 [] clause 9.2.2.1 |
| >gNB-CU-UP | | | | |
| >>AMF UE NGAP ID | M | | INTEGER | 3GPP 38.463 [] clause 9.3.1.4 |
| >>RAN UE ID | O | | OCTET STRING | 3GPP 38.473 [] clause 9.2.2.1 |
| >ng-eNB CU | | | | |
| >>AMF UE NGAP ID | M | | INTEGER | 3GPP 38.413 [] clause 9.3.1.4 |
| >>RAN UE ID | O | | OCTET STRING | 3GPP 38.473 [] clause 9.2.2.1 |
| >ng-eNB DU | | | | |
| >>ng-eNB-CU UE W1AP ID | M | | INTEGER | 3GPP 37.473 [] clause 9.3.1.4 |
| >en-gNB-CU | | | | |
| >>MeNB UE X2AP ID | M | | INTEGER | 3GPP 36.423 [] clause 9.3.1.4 |
| >>Global eNB ID | M | | OCTET STRING | 3GPP 36.423 [] clause 9.3.22 |
| >>gNB-CU UE F1AP ID | M | | INTEGER | 3GPP 38.473 [] clause 9.3.1.4 |
| >>RAN UE ID | O | | OCTET STRING | 3GPP 38.473 [] clause 9.2.2.1 |
| >en-gNB-CU-CP | | | | |
| >>MeNB UE X2AP ID | M | | INTEGER | 3GPP 36.423 [] clause 9.3.1.4 |
| >>Global eNB ID | M | | OCTET STRING | 3GPP 36.423 [] clause 9.3.22 |
| >>gNB-CU UE F1AP ID | M | | INTEGER | 3GPP 38.473 [] clause 9.3.1.4 |
| >>gNB-CU UE F1AP ID List | | 1 | | |
| >>>gNB-CU UE E1AP ID Item | | 1...max E1APId | | |
| >>>>>gNB-CU-CP UE E1AP ID | M | | INTEGER | 3GPP 38.463 [] clause 9.3.1.4 |
| >>RAN UE ID | O | | OCTET STRING | 3GPP 38.473 [] clause 9.2.2.1 |
| >en-gNB-DU | | | | |
| >>gNB-CU UE F1AP ID | M | | INTEGER | 3GPP 38.473 [] clause 9.3.1.4 |
| >>RAN UE ID | O | | OCTET STRING | 3GPP 38.473 [] clause 9.3.2.1 |
| >en-gNB-CU-UP | | | | |
| >>gNB-CU-CP UE E1AP ID | M | | INTEGER | 3GPP 38.473 [] clause 9.3.1.4 |
| >>RAN UE ID | O | | OCTET STRING | 3GPP 38.473 [] clause 9.3.2.1 |
| >eNB | | | | |
| >>MME UE S1AP ID | M | | INTEGER | 3GPP 36.413 [] clause 9.2.2.3 |
| >>GUMMEI | M | | OCTET STRING | 3GPP 36.413 [] clause 9.2.2.1 |
| >>MeNB UE X2AP ID | C | | INTEGER | Conditionally present when DC is established. To be reported by both MN and SN 3GPP 36.423 []clause 9.3.1.4 |
| >>Global eNB ID | C | | OCTET STRING | Conditionally present when DC is established. To be reported only by SN 3GPP 36.423 []clause 9.2.22 |

FIG.17BY

| IE/Group Name | Presence | Range | IE type and reference | Semantics description |
|---|---|---|---|---|
| CHOICE Modification Type | M | | | |
| >add | | | | If updated part is adding UE ID component |
| >release | | | | If updated part is releasing UE ID component |
| CHOICE E2 Node Type | M | | | |
| >gNB/ng-eNB | | | | |
| >>(updatede) GUAMI | C | | OCTET STRING | 3GPP 38.413 [] clause 9.3.3.3<br>Conditionally present when GUAMI update is required and in this case Modification Type is "add". |
| >>M-NG-RAN node UE XnAP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |
| >gNB-CU-CP | | | | |
| >>(updatede) GUAMI | C | | OCTET STRING | 3GPP 38.413 [] clause 9.3.3.3<br>Conditionally present when GUAMI update is required and in this case Modification Type is "add". |
| >>gNB-CU UE F1AP ID List | | 0.1 | | More than 1 F1AP ID shall be reported only when NR-DC is establisged without Xn I/F.<br>(However if RN-DC is established Xn I/F, 1 F1AP ID for can be available → we can remove this comment at all) |
| >>gNB-CU UE F1AP ID Item | | 1 ..maxF1ApId | | |
| >>>gNB-CU UE F1AP ID | O | | INTEGER | 3GPP 38.473 [] clause 9.3.1.4 |
| >>gNB-CU UE E1AP ID List | | 0.1 | | |
| >>>>gNB-CU-UP E1AP ID Item | | 1 ..maxF1ApId | | |
| >>>>gNB-CU-CP UE E1AP ID | M | | INTEGER | 3GPP 38.463 [] clause 9.3.1.4 |
| >>M-NG-RAN node UE XnAP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |
| >gNB-CU | | | | |
| >>(updatede) GUAMI | C | | OCTET STRING | 3GPP 38.413 [] clause 9.3.3.3<br>Conditionally present when GUAMI update is required and in this case Modification Type is "add". |
| >>gNB-CU UE F1AP ID List | | 0.1 | | |
| >>gNB-CU UE F1AP ID Item | | 1 ..maxF1ApId | | |
| >>>gNB-CU UE F1AP ID | M | | INTEGER | 3GPP 38.473 [] clause 9.3.1.4 |
| >>M-NG-RAN node UE XnAP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |

FIG.17CX

| IE/Group Name | Presence | Range | IE type and reference | Semantics description |
|---|---|---|---|---|
| >ng-eNB CU | | | | |
| >>(updatede) GUAMI | C | | OCTET STRING | 3GPP 38.413 [] clause 9.3.3.3<br>Conditionally present when GUAMI update is required and in this case Modification Type is "add". |
| >>gNB-CU UE F1AP ID List | | 0.1 | | |
| >>gNB-CU UE F1AP ID Item | | 1 ..maxF1ApId | | |
| >>>>>gNB-CU UE F1AP ID | O | | INTEGER | 3GPP 38.473 [] clause 9.3.1.4 |
| >>M-NG-RAN node UE XnAP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |
| >ng-eNB CU | | | | |
| >>(updatede) GUAMI | C | | OCTET STRING | 3GPP 38.413 [] clause 9.3.3.3<br>Conditionally present when GUAMI update is required and in this case Modification Type is "add". |
| >>>ng-eNB-CU UE W1AP ID | O | | INTEGER | 3GPP 37.473 [] clause 9.3.1.4 |
| >>M-NG-RAN node UE XnAP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |
| >en-gNB-CU-CP | | | | |
| >>gNB-CU UE F1AP ID | O | | INTEGER | 3GPP 38.463 [] clause 9.3.1.4 |
| >>gNB-CU UE E1AP ID List | | 0.1 | | |
| >>gNB-CU UE E1AP ID Item | | 1 ..maxF1ApId | | |
| >>>>>gNB-CU CP UE E1AP ID | M | | INTEGER | 3GPP 38.463 [] clause 9.3.1.4 |
| >eNB | | | | |
| >>MeNB UE X2AP ID | C | | INTEGER | Conditionally present when DC is established. To be reported by MN when DC over Xn I/F is established or released.<br>IF DC Secondary Node is added or released, MN will report this with Modification Type=add or release<br>3GPP 38.423 [] clause 9.3.1.4 |
| >>Global eNB ID | C | | OCTET STRING | Conditionally present when DC is established. To be reported by MN when DC over Xn I/F is established or released.<br>IF DC Secondary Node is added or released, MN will report this with Modification Type=add or release<br>3GPP 36.423 [] clause 9.2.22 |

FIG.17CY

| IE/Group Name | Presence | Range | IE type and reference | Semantics description |
|---|---|---|---|---|
| CHOICE Modification Type | M | | | |
| >add | | | | If updated part is for UE ID component UE ID component. |
| >release | | | | If updated part is for UE ID component UE ID component. |
| CHOICE E2 Node Type | M | | | |
| >gNB/ ng-eNB | | | | |
| >AMF UE NGAP ID | C | | INTEGER | 3GPP 38.413 [] clause 9.3.3.1 // |
| >>(updated) GUAMI | C | | OCTET STRING | 3GPP 38.413 [] clause 9.3.3.3 Conditionally present when GUAMI update is required and in this case Modification Type is "add". |
| >>M-NG-RAN node UE XnAP ID | C | | INTEGER | Conditionally present when DC is established or released. If DC Secondary Node is added or released, MN will report this with Modification Type = add or release. 3GPP 38.423 [] clause 9.3.1.4 |
| >>Global gNB ID | C | | OCTET STRING | Conditionally present when DC is established or released. If DC Secondary Node is added or released, MN will report this with Modification Type = add or release. 3GPP 38.423 [] clause 9.2.2.3 |
| >gNB-CU-CP | | | | |
| >AMF UE NGAP ID | C | | INTEGER | 3GPP 38.413 [] clause 9.3.3.1 Conditionally absent for Secondary Node (or Slave Node) when DC is established over Xn I/F. |
| >>(updated) GUAMI | C | | OCTET STRING | 3GPP 38.413 [] clause 9.3.3.3 Conditionally present for Primary Node when GUAMI update is required and in this case Modification Type is "add". Conditionally absent for Secondary Node (or Slave Node) when DC is established over Xn I/F |
| >>gNB-CU-UE F1AP ID List | | 0..1 | | |
| >>>gNB-CU-UE F1AP ID Item | | 0..1 max F1APId | | |
| >>>>gNB-CU-UE F1AP ID | M | | INTEGER | 3GPP 38.473 [] clause 9.3.1.4 |
| >>gNB-CU-UE E1AP ID List | | 0..1 | | |
| >>>gNB-CU-UE E1AP ID Item | | 0..1 max F1APId | | |
| >>>>gNB-CU-UE E1AP ID | M | | | 3GPP 38.463 [] clause 9.3.1.4 |
| >>M-NG-RAN node UE XnAP ID | C | | INTEGER | Conditionally present when DC is established or released. If DC Secondary Node is added or released, MN will report this with Modification Type = add or release. 3GPP 38.423 [] clause 9.3.1.4 |
| >>Global gNB ID | C | | OCTET STRING | Conditionally present when DC is established or released. If DC Secondary Node is added or released, MN will report this with Modification Type = add or release. 3GPP 38.423 [] clause 9.2.2.3 |
| >gNB-CU | | | | |
| >AMF UE NGAP ID | C | | INTEGER | 3GPP 38.413 [] clause 9.3.3.1 Conditionally absent for Secondary Node (or Slave Node) when DC is established ober Xn I/F. |
| >>(updated) GUAMI | C | | OCTET STRING | 3GPP 38.413 [] clause 9.3.3.1 Conditionally present for Primary Node when GUAMI update is required and in this case Modification Type is "add". Conditionally absent for Secondary Node (or Slave Node) when DC is established over Xn I/F |
| >>gNB-CU-UE F1AP ID List | | 0..1 | | |
| >>>gNB-CU-UE F1AP ID Item | | 0..1 max F1APId | | |
| >>>>gNB-CU-UE F1AP ID | M | | INTEGER | 3GPP 38.473 [] clause 9.3.1.4 |
| >>M-NG-RAN node UE XnAP ID | C | | INTEGER | Conditionally present when DC is established or released. If DC Secondary Node is added or released, MN will report this with Modification Type = add or release. For Secondary Node, it will be used as key UE ID part. 3GPP 38.423 [] clause 9.3.1.4 |
| >>Global gNB ID | C | | OCTET STRING | Conditionally present when DC is established or released. If DC Secondary Node is added or released, MN will report this with Modification Type = add or release. For Secondary Node, it will used as key UE ID part. 3GPP 38.423 [] clause 9.2.2.3 |

FIG.17DX

| IE/Group Name | Presence | Range | IE type and reference | Semantics description |
|---|---|---|---|---|
| >ng-eNB CU | | | | |
|   >>AMF UE NGAP ID | M | | INTEGER | 3GPP 38.413 [] clause 9.3.3.1<br>Conditionally absent for Secondary Node (or Slave Node) when DC is established ober Xn I/F. |
|   >>GUAMI | O | | OCTET STRING | 3GPP 38.413 [] clause 9.3.3.3<br>Conditionally present for Primary Node when GUAMI update is required and in this case Modification Type is "add".<br>Conditionally absent for Secondary Node (or Slave Node) when DC is established over Xn I/F |
|   >>ng-eNB-CU UE W1AP ID | O | | INTEGER | 3GPP 37.473 [] clause 9.3.1.4 |
|   >>M-NG-RAN node UE XnAP ID | C | | INTEGER | Conditionally present when DC is established or released.<br>If DC Secondary Node is added or released, MN will report this with Modification Type = add or release. For Secondary Node, it will used as key UE ID part.<br>3GPP 38.423 [] clause 9.3.1.4 |
|   >>Gobal gNB ID | C | | OCTET STRING | Conditionally present when DC is established or released.<br>If DC Secondary Node is added or released, MN will repory this with Modification Tpye = add or release.<br>For Secondary Node, it will be used as key UE ID part. 3GPP 38.423 [] clause 9.2.2.3 |
| >en-gNB-CU | | | | |
|   >>MeNB UE X2AP ID | M | | INTEGER | 3GPP 36.423 [] clause 9.3.1.4 |
|   >>Global eNB ID | M | | OCTET STRING | 3GPP 36.423 [] clause 9.2.22 |
|   >>gNB-CU UE F1AP ID | O | | INTEGER | 3GPP 38.473 [] clause 9.3.1.4 |
| >en-gNB-CU-CP | | | | |
|   >>MeNB UE X2AP ID | M | | INTEGER | 3GPP 36.423 [] clause 9.3.1.4 |
|   >>Global eNB ID | M | | OCTET STRING | 3GPP 36.423 [] clause 9.2.22 |
|   >>gNB-CU UE F1AP ID | O | | INTEGER | 3GPP 38.473 [] clause 9.3.1.4 |
|   >>gNB-CU UE E1AP ID List | | 0..1 | | |
|    >>>gNB-CU UE E1AP ID Item | | 0..1 max F1APId | | |
|     >>>>gNB-CU-CP UE E1AP ID | M | | INTEGER | 3GPP 38.473 [] clause 9.3.1.4 |
| >eNB | | | | |
|   >>MME UE S1AP ID | M | | INTEGER | 3GPP 36.413 [] clause 9.2.2.3 |
|   >>MeNB UE X2AP ID | M | | INTEGER | Conditionally present when DC is established or released.<br>If DC Secondary Node is added or released, MN will repory this with Modification Tpye = add or release.<br>For Secondary Node, it will be used as key UE ID part. 3GPP 36.423 [] clause 9.3.1.4 |
|   >>Global eNB ID | O | | OCTET STRING | Conditionally present when DC is established or released.<br>If DC Secondary Node is added or released, MN will repory this with Modification Tpye = add or release.<br>For Secondary Node, it will be used as key UE ID part. 3GPP 36.423 [] clause 9.2.22 |

FIG.17DY

APPARATUS AND METHOD FOR CONTROLLING E2 NODE IN WIRELESS COMMUNICATION SYSTEM

CROSS-REFERENCE TO RELATED APPLICATION(S)

This application is a U.S. National Stage application under 35 U.S.C. § 371 of an International application number PCT/KR2022/005457, filed on Apr. 15, 2022, which is based on and claimed priority of a Korean patent application number 10-2021-0050167, filed on Apr. 16, 2021, in the Korean Intellectual Property Office, the disclosure of which is incorporated by reference herein in its entirety.

TECHNICAL FIELD

The disclosure relates to an apparatus and a method for controlling an E2 node by a radio access network (RAN) intelligent controller (RIC) in a radio access network. More particularly, the disclosure relates to an apparatus and a method for controlling an E2 node through an E2 message according to open radio access network (O-RAN) standards of a wireless communication system.

BACKGROUND ART

5th generation (5G) mobile communication technologies define broad frequency bands such that high transmission rates and new services are possible, and may be implemented not only in "Sub 6 giga hertz (GHz)" bands such as 3.5 GHz, but also in "Above 6 GHz" bands referred to as a millimeter wave (mmWave) including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

In order to meet the demand for wireless data traffic, a 5G system, new radio or next radio (NR) are commercialized, and it is expected that a service of a high data transmission rate is provided to users through a 5G system like 4th generation (4G), and wireless communication services having various purposes, such as Internet of Things (IoT) and a service requiring high reliability for a specific purpose, are provided. The open radio access network (O-RAN), which was established by operators and equipment providers in a system mixed with a 4G communication system and a 5G system, defines new network element (NE) and interface standards based on existing 3$^{rd}$ generation partnership project (3GPP), and suggests an O-RAN structure.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and a method for an E2 node to transmit a user equipment (UE) identifier (ID) to a radio access network (RAN) intelligent controller (RIC) in a wireless communication system.

Another aspect of the disclosure is to provide an apparatus and a method for a message format related to a UE ID management service model applied in a Near-RT.

Additional aspects will be set forth in part in the description which follows and, in part, will be apparent from the description, or may be learned by practice of the presented embodiments.

Technical Solution

In accordance with an aspect of the disclosure, a method performed by an E2 node is provided. The method includes receiving a subscription request message from a radio access network (RAN) intelligent controller (RIC), transmitting a subscription response message to the RIC, and when an event occurs in response to the subscription response message, transmitting a RIC indication message to the RIC, and the RIC indication message may include a user equipment (UE) identifier (ID) which is managed at a higher node associated with the E2 node.

In accordance with another aspect of the disclosure, a method performed by a radio access network (RAN) intelligent controller (RIC) is provided. The method includes transmitting a subscription request message to an E2 node, receiving a subscription response message from the E2 node, and receiving, from the E2 node, a RIC indication message which is transmitted when an event occurs in response to the subscription response message, and the RIC indication message may include a user equipment (UE) identifier (ID) which is managed at a higher node associated with the E2 node.

In accordance with another aspect of the disclosure, an apparatus performed by an E2 node is provided. The apparatus includes at least one transceiver, and at least one processor, and the at least one processor may control the at least one transceiver to receive a subscription request message from a radio access network (RAN) intelligent controller (RIC), transmit a subscription response message to the RIC, and when an event occurs in response to the subscription response message, transmit a RIC indication message to the RIC, and the RIC indication message may include a user equipment (UE) identifier (ID) which is managed at a higher node associated with the E2 node.

In accordance with another aspect of the disclosure, an apparatus performed by a radio access network (RAN) intelligent controller (RIC) is provided. The apparatus includes at least one transceiver, and at least one processor, and the at least one processor may control the at least one transceiver to transmit a subscription request message to an E2 node, receive a subscription response message from the E2 node, and receive, from the E2 node, a RIC indication message which is transmitted when an event occurs in response to the subscription response message, and the RIC indication message may include a user equipment (UE) identifier (ID) which is managed at a higher node associated with the E2 node.

Advantageous Effects

The apparatus and the method according to embodiments of the disclosure may identify a UE ID applied according to an event, a service model that a radio access network (RAN) intelligent controller (RIC) is using in a corresponding E2 node.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 17AX, 17AY, 17BX, 17BY, 17CX, 17CY, 17DX, and 17DY are view illustrating examples of an E2 service model (E2SM)-IDM indication message format according to various embodiments of the disclosure;

The same reference numerals are used to represent the same elements throughout the drawings.

MODE FOR INVENTION

Figure 1:
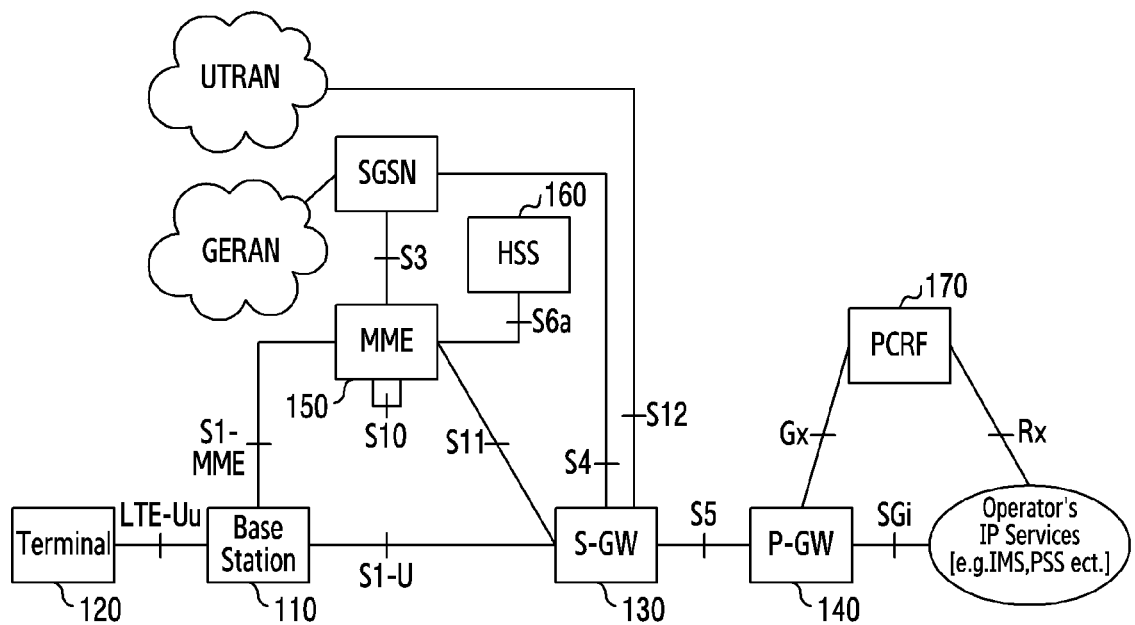
FIG. 1 illustrates an example of a 4$^{th}$ generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to a control procedure between a device in a radio access network (RAN) and a device controlling the RAN in a wireless communication system. Specifically, the disclosure relates to a procedure, a message, and a method, according to which a RIC on an E2 interface in a radio access network transmits a RIC control request message to an E2 node, and determines whether the RIC control request is correctly accepted by the E2 node, and, if there is failure, discovers the reason for failure.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments by using terms used in some communication standards (for example, $3^{rd}$ generation partnership project (3GPP), open radio access network (O-RAN)), but these embodiments are merely examples. Various embodiments of the disclosure may be easily modified and applied to other communication systems.

As $4^{th}$ generation (4G)/$5^{th}$ generation (5G) communication systems (for example, new radio (NR)) are currently commercialized, there is a demand for support of a differentiated service for a user in a virtualized network. The 3GPP is a joint research project among mobile communication-related organizations, and aims at establishing $3^{rd}$ generation mobile communication system standards which are globally applicable within the range of IMT-2000 project of International Telecommunication Union (ITU). The 3GPP was established in December 1998, and 3GPP standards are based on enhanced GSM standards, and includes all of radio and core network, service architecture in standardization ranges. Accordingly, the open radio access network (O-RAN) newly defined a radio unit (RU), a distributed unit (or a digital unit) (DU), a central unit (CU)-control plane (CP), a CU-user plane (UP), which are nodes constituting a 3GPP network entity (NE) and a base station, as an O-RAN (O)-RU, an O-DU, an O-CU-CP, an O-CU-UP, respectively, and additionally, standardized a near real time (NRT) radio access network intelligent controller (RIC). The disclosure is to support an operator specific service model in an E2 interface through which a RIC requests a service from an O-DU, an O-CU-CP, or an O-CU-UP. Herein, the O-RU, O-DU, O-CU-CP, O-CU-UP may be understood as entities constituting a RAN which operates according to O-RAN standards, and may be referred to as E2 nodes. An interface with entities constituting the RAN operating according O-RAN standards between the RIC and the E2 nodes uses an application protocol (E2AP).

The RIC is a logical node that collects information in a cell site where a terminal and an O-DU, an O-CU-CP, or an O-CU-UP receive or transmit signals. The RIC may be implemented in the form of a server which is concentrically disposed in one physical place. Connection may be made between the OD-DU and the RIC, between the O-CU-CP and the RIC, between the O-CU-UP and the RIC through Ethernet. To achieve this, interface standards for communication between the O-DU and the RIC, between the O-CU-CP and the RIC, between the O-CU-UP and the RIC are required, and message standards of E2-DU, E2-CU-CP, E2-CU-UP, and a definition of a procedure between the O-DU, O-CU-CP, O-CU-UP and the RIC are required. In particular, there is a demand for support of a differentiated service for a user in a virtualized network, and, as a call processing message/function generated in the O-RAN is concentrated on the RIC, there is a need for a function definition of a message of E2-DU, E2-CU-UP, E2-CU-UP for supporting a service for a wide cell coverage.

The RIC may perform communication with the O-DU, O-CU-CP, O-CU-UP by using an E2 interface, and may set an event generation condition by generating and transmitting a subscription message. Specifically, the RIC may set a call processing EVENT by generating an E2 subscription Request message and transmitting the message to an E2 node (for example, an O-CU-CP, an O-CU-UP, an O-DU). In addition, after the EVENT is set, the E2 node transmits a Subscription Request Response message to the RIC.

The E2 node may transmit a current state to the RIC through an E2 indication/report. The RIC may provide control of the O-DU, O-CU-CP, O-CU-UP by using an E2 control message. Various embodiments of the disclosure suggest an E2 indication message for transmitting measurement information obtained on a UE basis, according to a period set under a subscription event condition at the O-DU. In addition, various embodiments of the disclosure suggest a message for controlling resources to be transmitted from the RIC to the O-DU.

Terms used in the disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the disclosure. Among the terms used in the disclosure, terms defined in a general dictionary may be interpreted as having the same or similar meanings as those in the context of the related art, and unless explicitly defined in the disclosure, may not be interpreted as ideal or excessively formal meanings. In some cases, even terms defined in the disclosure may not be interpreted to exclude embodiments of the disclosure.

A hardware-based approach will be described as an example in various embodiments of the disclosure to be described hereafter. However, various embodiments of the disclosure include technology which uses both hardware and software, and accordingly various embodiments of the disclosure do not exclude a software-based approach.

Hereafter, the disclosure relates to an apparatus and a method for performing a subscription procedure between a device in a radio access network (RAN) and a device for controlling the RAN in a wireless communication system.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

In addition, the disclosure describes various embodiments using terms used in some communication standard (e.g., $3^{rd}$ generation partnership project (3GPP)), but this is only an example for description. Various embodiments of the disclosure may be easily modified and applied in other communication systems.

Hereafter, an uplink indicates a radio link for transmitting data or a control signal from a user equipment (UE) or a mobile station (MS) to an eNode B or a base station (BS), and a downlink indicates a radio link for transmitting data or a control signal from the eNode B to the UE in the disclosure. Also, the eNode B is an entity of performing resource allocation of the UE, and may be at least one of an eNode B, a Node B, a BS, a generation node B (gNB) radio access unit, a BS controller, or a node on the network. The UE may include a UE, an MS, a cellular phone, a smart phone, a computer, or a multimedia system for performing a communication function.

A $5^{th}$ generation (5G) communication system (hereafter, may be used interchangeably with a 5G system, new radio or next radio (NR)) is commercialized to satisfy demand for wireless data traffic, and provide a high data rate service to users through the 5G system like 4G, and it is also expected that wireless communication services for various purposes such as a service requiring high reliability may be provided for internet of things and specific purposes.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

Also, in the disclosure, to determine whether a specific condition is satisfied or fulfilled, expressions such as greater than or less than are used but are merely an expression by way of example and do not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

In addition, the disclosure describes various embodiments using terms used in some communication standard (e.g., 3GPP), but this is only an example for description. Various embodiments of the disclosure may be easily modified and applied in other communication systems.

Open-RAN (O-RAN) established by operators and equipment providers in a system where the current 4G communication system and the 5G system are mixed defines a new network element (NE) and an interface standard based on the existing 3GPP standard, and thus presents an O-RAN structure. The O-RAN newly defines the existing 3GPP network entity (NE), radio unit (RU), distributed unit (DU), central unit (CU)-control plane (CP), and CU-user plane (UP) as O-RU, O-DU, O-CU-CP, and O-CU-UP respectively, and besides, the O-RAN standardized a near-real-time RAN intelligent controller (RIC) and a non-real-time (NRT) RIC. The RIC intensively deploys a server at one physical place, and is a logical node for collecting information on a cell site transmitted and received by the UE and the O-DU, the O-CU-CP or the O-CU-UP. The O-DU and the RIC, the O-CU-CP and the RIC, and the O-CU-UP and the RIC may be connected via Ethernet. For doing so, interface standards for communications between the O-DU and the RIC, between the O-CU-CP and the RIC, and between the O-CU-UP and the RIC are required, and message formats such as E2-DU, E2-CU-CP, E2-CU-UP requires procedure definitions between the O-DU, the O-CU-CP, the O-CU-UP and the RIC. In particular, differentiated service support is required for users in a virtualized network, and it is necessary to define functions of the messages of E2-DU, E2-CU-CP and E2-CU-UP to support a service for wide cell coverage, by concentrating a call processing message/function generating in the O-RAN on the RIC.

Specifically, the RIC may generate and transmit an E2 subscription message to the O-DU, the O-CU-CP, or the O-CU-UP and thus set an event occurrence condition. The O-DU, the O-CU-CP, or the O-CU-UP may determine that the set condition is satisfied, load a 3GPP call processing message corresponding to the satisfied condition in a container to the RIC, classify into a user identifier, a cell identifier, a network slice identifier and so on, and then transmit through an E2 indication/report.

Call processing message information collected in the O-RAN based on the user identifier may be identified that the RIC is for a specific user/specific cell/specific network slice per I/F. The collected information may be transmitted from at least one of the (O-)CU-CP, the (O-)CU-UP, and the (O-)DU. The RIC may identify based on the user identifier that information collected from different entities is related to one specific user/specific cell/specific network slice, provide a specialized service for the specific user/specific cell/specific network slice with respect to a plurality of cells/network slices based on the collected information, and determine a key performance indicator (KPI) of a service provided to each user.

Since a general call processing service is restricted to a base station basis, the number of supportable cells is limited. In addition, since the collected information is limited to a specific base station, efficient monitoring on radio resources for the whole was not possible. According to various embodiments of the disclosure, the RIC may collect call processing messages (e.g., E1, F1, X2, XN, RRC, etc.) generated by the O-RU, the O-DU, the O-CU-CP or the O-CU-UP per I/F or respectively, and thus efficiently provide resource optimization and a user specific service or a user requested service with respect to the specific user/specific cell/specific network slices for wide cells. For example, the RIC may configure an additional carrier by efficiently dividing the network slice or by serving a specific terminal through carrier aggregation for the resource optimization, or configure an additional cell for performing dual access to serve a specific terminal through dual connectivity (DC). In addition, the RIC may configure a specific terminal to avoid connection with a specific cell and to connect with a specific cell in inter-cell movement. In addition, the RIC may efficiently perform the resource optimization through machine learning through analysis based on the collected information. In addition, the resource optimization of the disclosure is not limited to the described content. Also, according to the disclosure, it is possible not only to collect information per terminal but also to collect and analyze information per bearer.

The collected information of the specific user may be used at the collection server, the RIC or the NRT-RIC but may be also provided to an operations support system (OSS) or/and a business support system (BSS) to provide the specialized service to the user.

FIG. 1 illustrates an example of a 4th generation (4G) long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME). 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 through an S1-MME interface. Besides the base station, the base station 110 may be referred to as an 'access point (AP)', an 'eNodeB (eNB)', a 'wireless point', and a 'transmission/reception point (TRP)' or other term having the equivalent technical meaning.

The terminal 120 is a device used by the user, and performs communication with the base station 110 over a radio channel. In some cases, the terminal 120 may be operated without user's involvement. That is, at least one of the terminal 120 and the S-GW 130 is a device which performs machine type communication (MTC), and may not be carried by the user. Besides the terminal, the terminal 120 may be referred to as a 'UE', a 'mobile station', a 'subscriber station', a 'customer-premises equipment (CPE)', a 'remote terminal', a 'wireless terminal', or a 'user device', or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage accounting data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving general packet radio service (GPRS) support node (SGSN) 155.

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is transmitted from the PCRF 180 to the P-GW 140, and the P-GW 140 may control the terminal 120 (e.g., QoS management, charging, etc.) based on the information provided from the PCRF 180.

Carrier aggregation (hereafter, 'CA') technology is a technology which combines a plurality of component carriers, and transmits and receives at one terminal a signal using the plurality of the component carriers at the same time and thus increases frequency use efficiency in terms of the terminal or the base station. Specifically, according to the CA technology, the terminal and the base station may transmit and receive signals using a broadband using the plurality of the component carriers in the uplink (UL) and the downlink (DL), wherein the component carriers are located in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations positioned in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
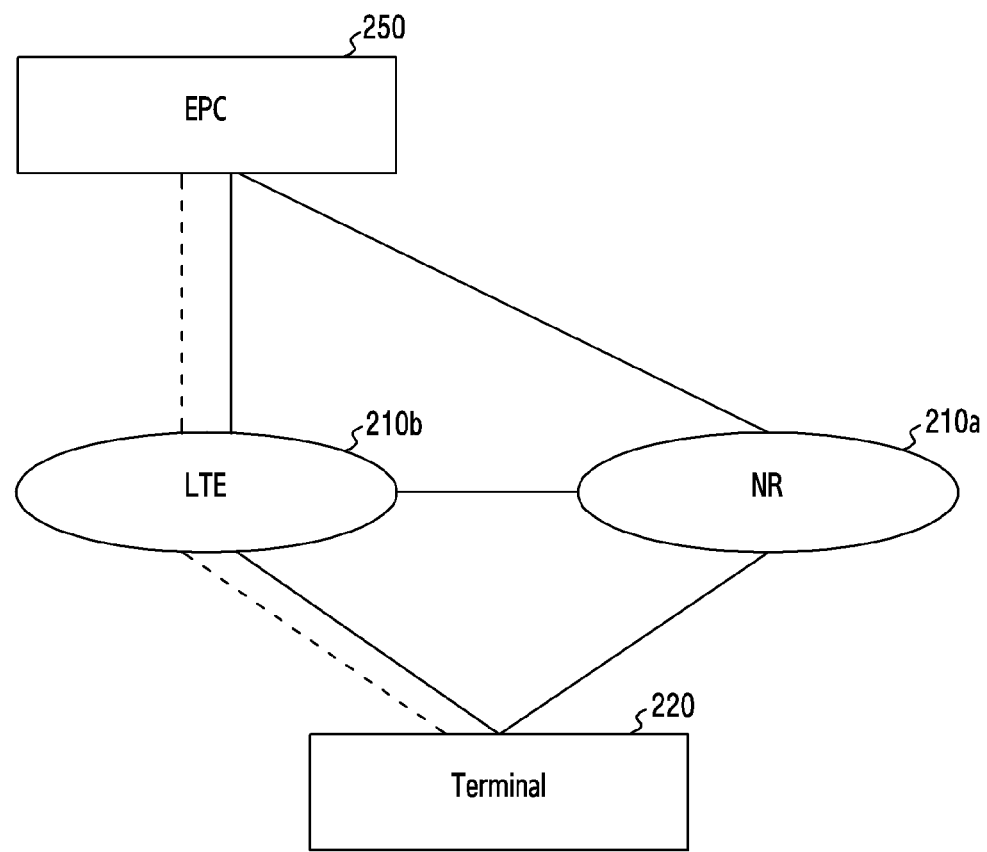
FIG. 2A illustrates an example of a 5$^{th}$ generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'next generation nodeB (gNB)' or other term having the equivalent technical meaning. In addition, the NR base station may have a structure divided into a CU and a DU, and the CU may also have a structure divided into a CU-CP unit and a CU-UP unit.

In the structure shown in FIG. 2A, the terminal 220 may perform radio resource control (RRC) access through the first base station (e.g., a base station belonging to the LTE RAN 210b), and may be served with functions (e.g., connection management, mobility management, etc.) provided in the control plane. In addition, the terminal 220 may receive additional radio resources for transmitting and receiving data via a second base station (e.g., a base station belonging to the NR RAN 210a). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
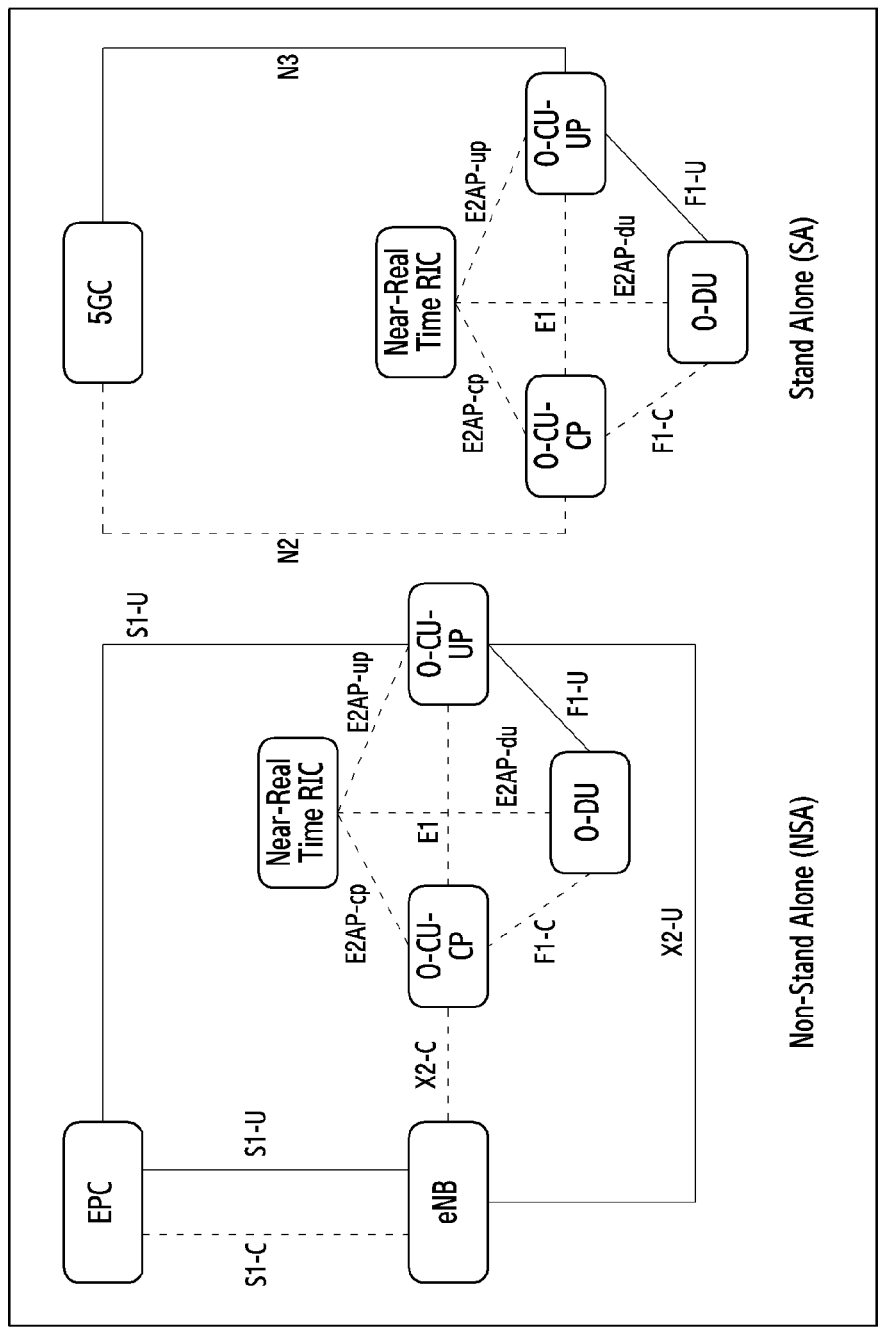
FIG. 2B illustrates an example of architecture for open-radio access network (O-RAN) according to an embodiment of the disclosure.

FIG. 2B shows an architecture example for the O-RAN according to an embodiment of the disclosure. For the sake of E2-SM-KPI monitoring (KPIMON) of an E2 service model, an O-RAN non-stand alone in the multi-connectivity operation using the E-UTRA and the NR radio access technology is considered, whereas the E2 node may be assumed to be in an O-RAN stand alone mode.

Referring to FIG. 2B, in deployment of the O-RAN non-stand alone mode, the eNB is connected with the EPC through an S1-C/S1-U interface, and is connected with the O-CU-CP through an X2 interface. The O-CU-CP for the deployment of the O-RAN stand alone mode may be connected with a 5G core (5GC) through an N2/N3 interface.

Figure 3:
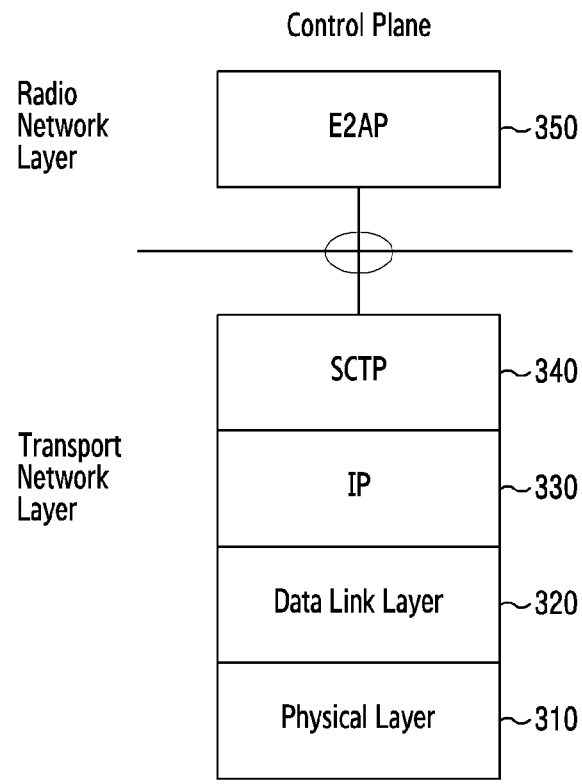
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an IP 330, and a stream control transmission protocol (SCTP) 340.

The radio network layer includes an E2AP 350. The E2AP 350 is used to deliver a subscription message, an indication message, a control message, a service update message, and a service query message, and is transmitted in a higher layer of the SCTP 340 and the IP 330.

Figure 4:
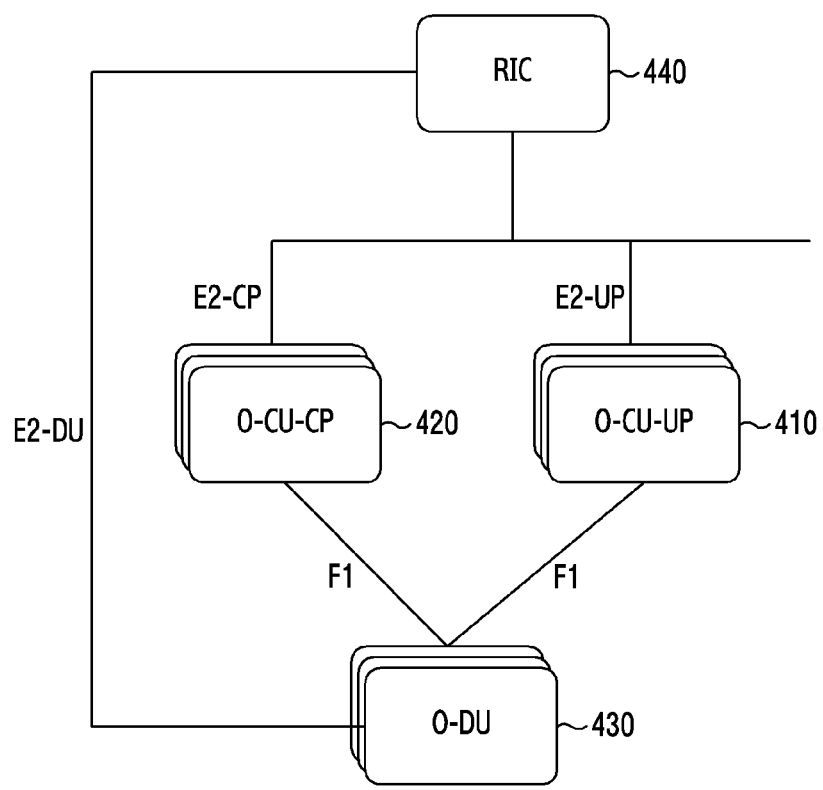
FIG. 4 illustrates an example of a connection between a base station and a RAN intelligence controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is connected to an O-CU-CP 420, an O-CU-UP 410, and an O-DU 430. The RIC 440 is a device for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node through E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
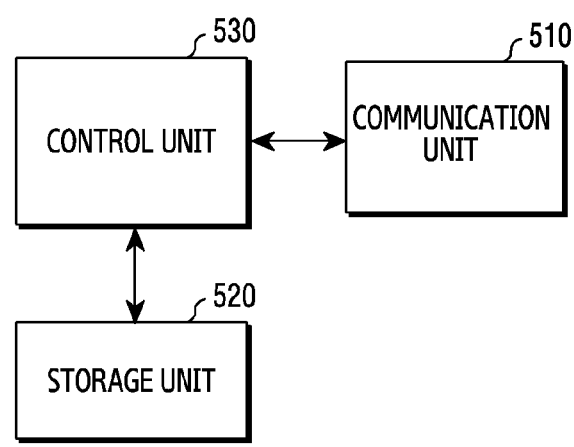
FIG. 5 illustrates a configuration of a device in a radio access network according to an embodiment of the disclosure.

FIG. 5 illustrates a configuration of a device according to an embodiment of the disclosure. The structure illustrated in FIG. 5 may be understood as a configuration of a device having at least one function of the RIC, the O-CU-CP, the O-CU-UP, and the O-DU of FIG. 5. A term such as '... unit' or '... er' used hereafter indicates a unit for processing at least one function or operation, and may be implemented using hardware, software, or a combination of hardware and software.

Referring to FIG. 5, a core network device includes a communication unit 510, a storage unit 520, and a control unit 530.

The communication unit 510 provides an interface for performing communication with other devices in the network. That is, the communication unit 510 converts a bit string transmitted from the core network device to another device into a physical signal, and converts a physical signal received from the other device into a bit string. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage unit 520 stores data such as a basic program, an application program, and setting information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor. According to various embodiments, the control unit 530 may control the device to carry out operations according to various embodiments explained in the disclosure.

Figure 6:
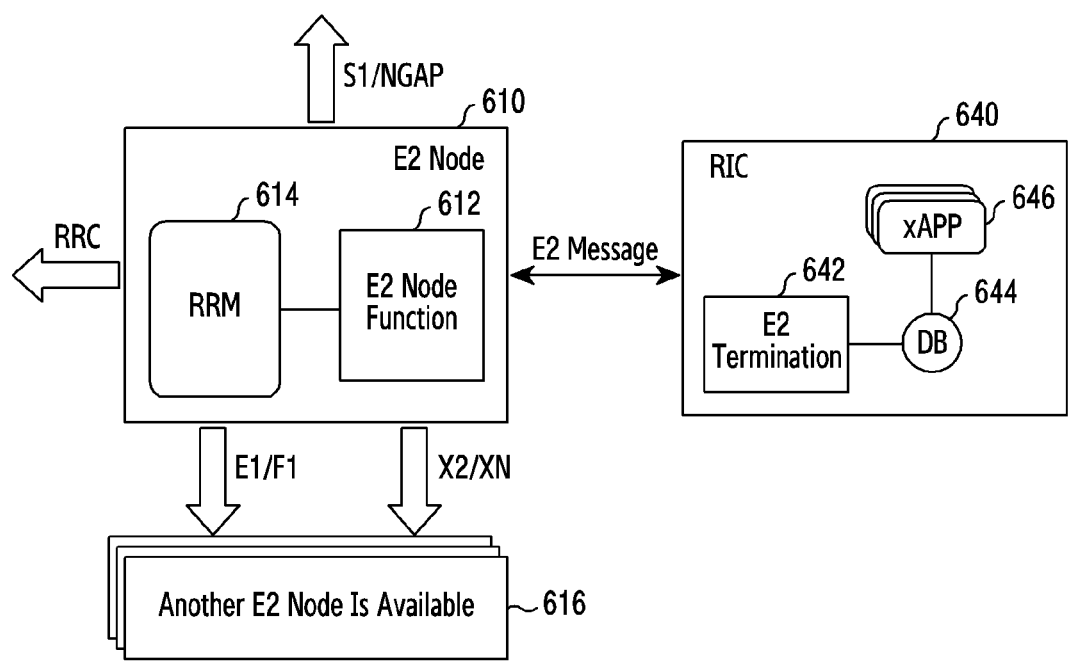
FIG. 6 illustrates logical functions related to E2 messages of an E2 node and a RIC in a radio access network according to an embodiment of the disclosure.

FIG. 6 illustrates logical functions related to E2 messages of an E2 node and an RIC in a radio access network according to an embodiment of the disclosure.

Referring to FIG. 6, an RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. Alternatively, for example, the E2 node 610 may perform communication through an S1 interface or a next generation application protocol (NGAP) interface (i.e., an interface between a next generation (NG) RAN node and an AMF).

The E2 node 610 may include an E2 node function 612. The E2 node function 612 is a function corresponding to a specific xApp (application S/W) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination 642 positioned at the RIC 640. The E2 node 610 may include a radio resource management (RRM) 614. The E2 node 610 may manage resources provided to the radio network for the terminal.

The E2 termination 642 positioned in the RIC 640, which is a termination of the RIC 640 for the E2 message, may perform a function of interpreting the E2 message forwarded by the E2 node 610 and then forwarding it to the xApp 646. A database (DB) 644 positioned in the RIC 640 may be used for the E2 termination 642 or the xApp 646. The E2 node 610 shown in FIG. 6 is a termination of at least one interface, and may be understood as a termination of messages transmitted to a terminal, a neighbor base station, and a core network.

Figure 7:
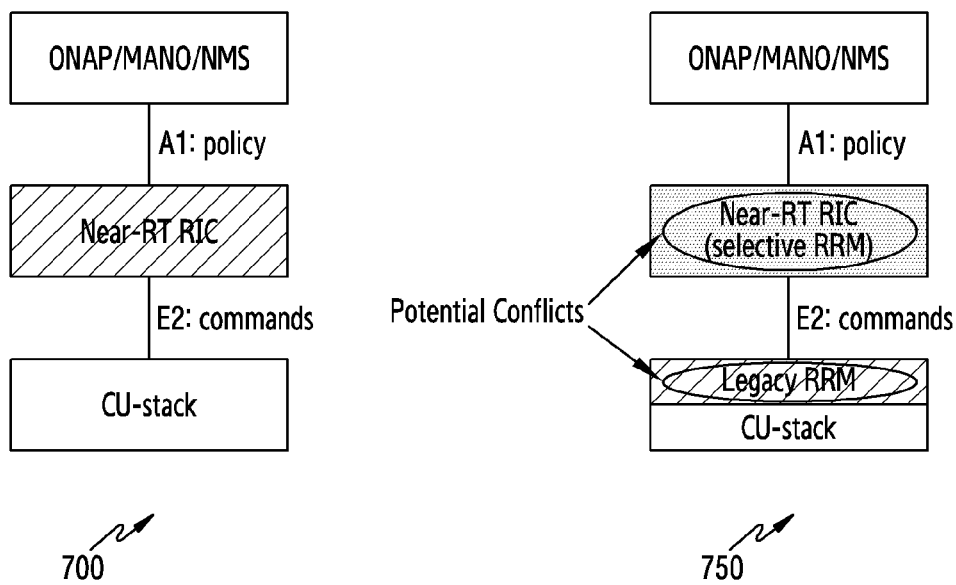
FIG. 7 is a view illustrating examples of function separation between an E2 node and a RIC according to an embodiment of the disclosure.

FIG. 7 illustrates examples of function separation between an E2 node and a RIC according to an embodiment of the disclosure. O-RAN standards provide function separation between the E2 node and the RIC. For example, the E2 node may be a CU. The RIC may be a Near RT RIC. The RIC may be connected with an open network automation platform (ONAP)/management and orchestration (MANO)/network management system (NMS) through an A1 interface. The RIC may be connected with the E2 node through an E2 interface. The E2 interface may transmit commands. The function separation option may include function separation 700 for managing the whole radio resource management (RRM) at the near-RT RIC, and function separation 750 for selectively managing RRM at the near-RT RIC.

Referring to FIG. 7, according to WG3 decision at the meeting dated Jan. 16, 2019, it is expected that the Near-RT RIC supports E2 through an open type logical interface which aims at providing a multi-supplier environment regardless of whether a specific RRC-RRM algorithm positioned in the nRT-RIC is implemented. In the disclosure, we may suggest an E2 service model radio interface control (E2SM-RIC) that makes a pair with E2SM-NI which may inject/modify/configure a per UE RRC message for each I/F and network entity (NE). In other words, the Near RT RIC may be gradually enhanced from the function separation 750 to the function separation 700. E2 may develop into an open-type logical interface which is independent from implementation of a specific RRC-RRM algorithm existing in the nRT-RIC, and aims at providing a multi-supplier environment.

Figure 8:
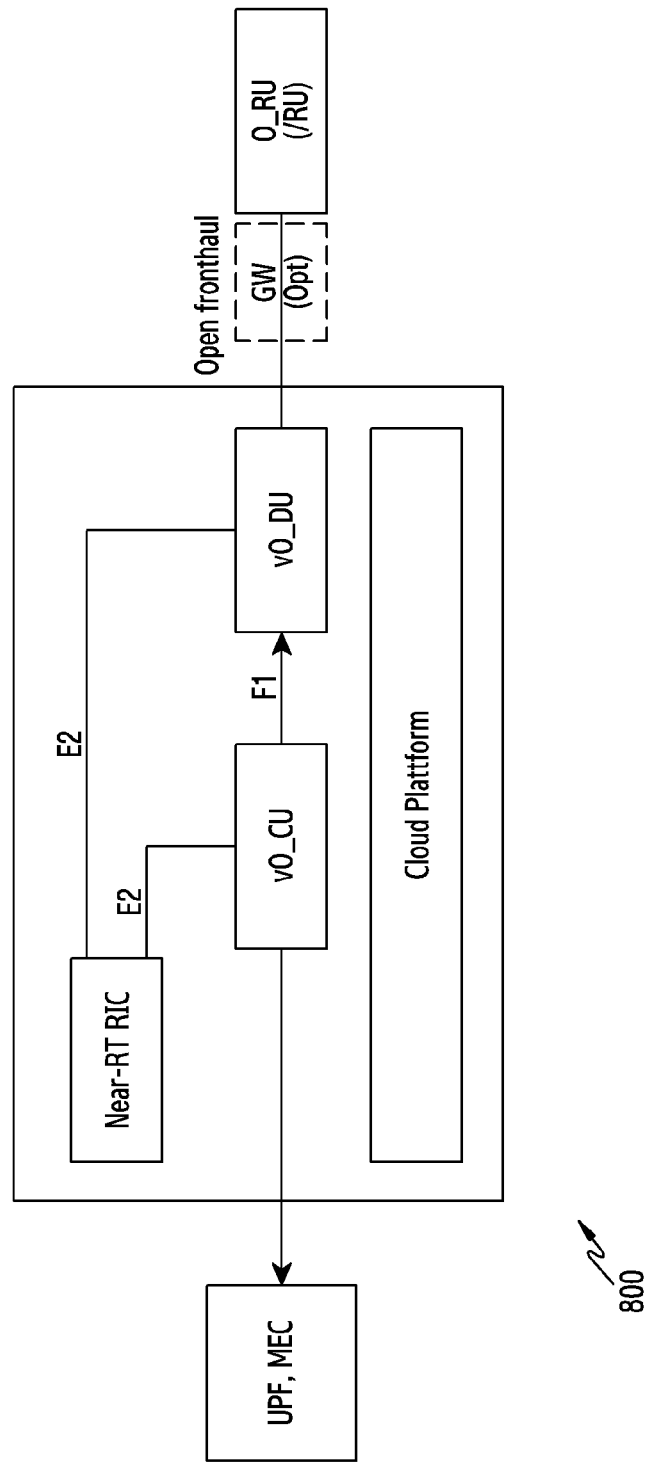
FIG. 8 is a view illustrating an example of implementation of the E2 node and the RIC according to an embodiment of the disclosure.

FIG. 8 illustrates an example of implementation of an E2 node and a RIC according to an embodiment of the disclosure.

Referring to FIG. 8, in the scenario of an implementation example 800, the E2 node (for example, an O-DU, an O-CU) and the RIC may be virtualized on a cloud platform (for example, an open-type chassis and a blade specification edge cloud) and may be configured in a device (for example, a server). This scenario may support distribution in a city area which is dense with a fronthaul capacity sufficient to allow a BBU function pulled at a center position, with a latency which is low enough to meet O-DU standby time requirements. Accordingly, there may be no need to try to centralize the RIC which is close to RT over a limit for centralizing the O-DU function. According to an embodiment, the E2SM-RIC may be optimized for an O-RAN distribution scenario in which a Near-RT RIC, an O-CU, and an O-DU are implemented in an O-Cloud platform.

Figure 9:
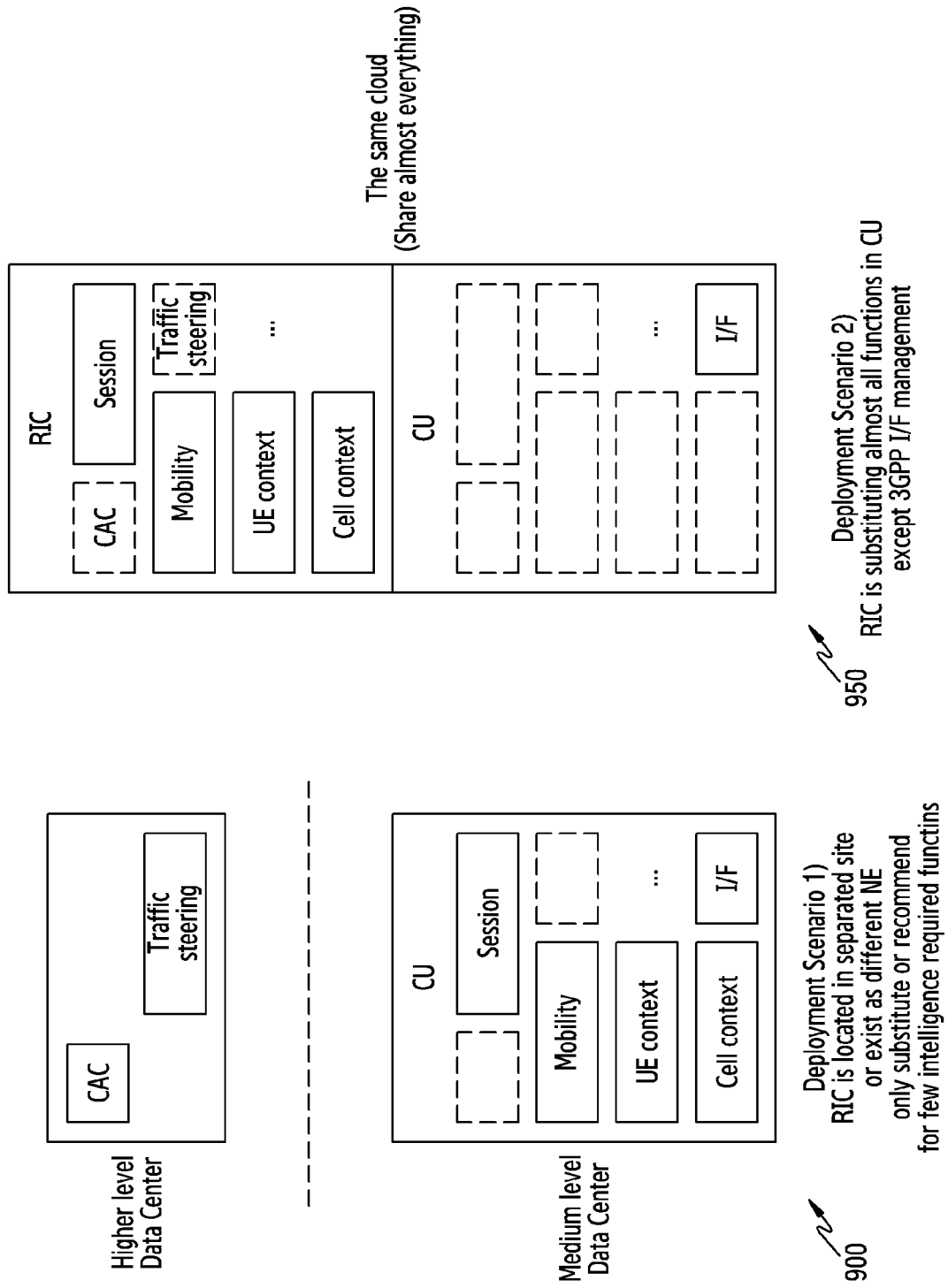
FIG. 9 is a view illustrating examples of function separation between a centralized unit (CU) and a RIC according to an embodiment of the disclosure.

FIG. 9 illustrates examples of function separation between a centralized unit (CU) and a RIC according to an embodiment of the disclosure.

Referring to FIG. 9, function separation may be performed according to deployment scenario #1 900 or function deployment scenario #2 950.

Deployment scenario #1 900: The RIC is located in a separated site or exists as a different NE, and a few intelligence required functions may be substituted or recommended.

Deployment scenario #2 950: The RIC may substitute almost all functions in a CU except 3GPP I/F management.

Although FIG. 9 illustrate two scenarios, other scenarios may be applied. For example, in deployment scenario #1 900, a mobility function may be performed by the RIC, not by the CU. In another example, in deployment scenario #1 900, a UE context function may be performed by the RIC, not by the CU. For example, in deployment scenario #1 900, a session establishment function may be performed by the RIC, not by the CU.

Figure 10:
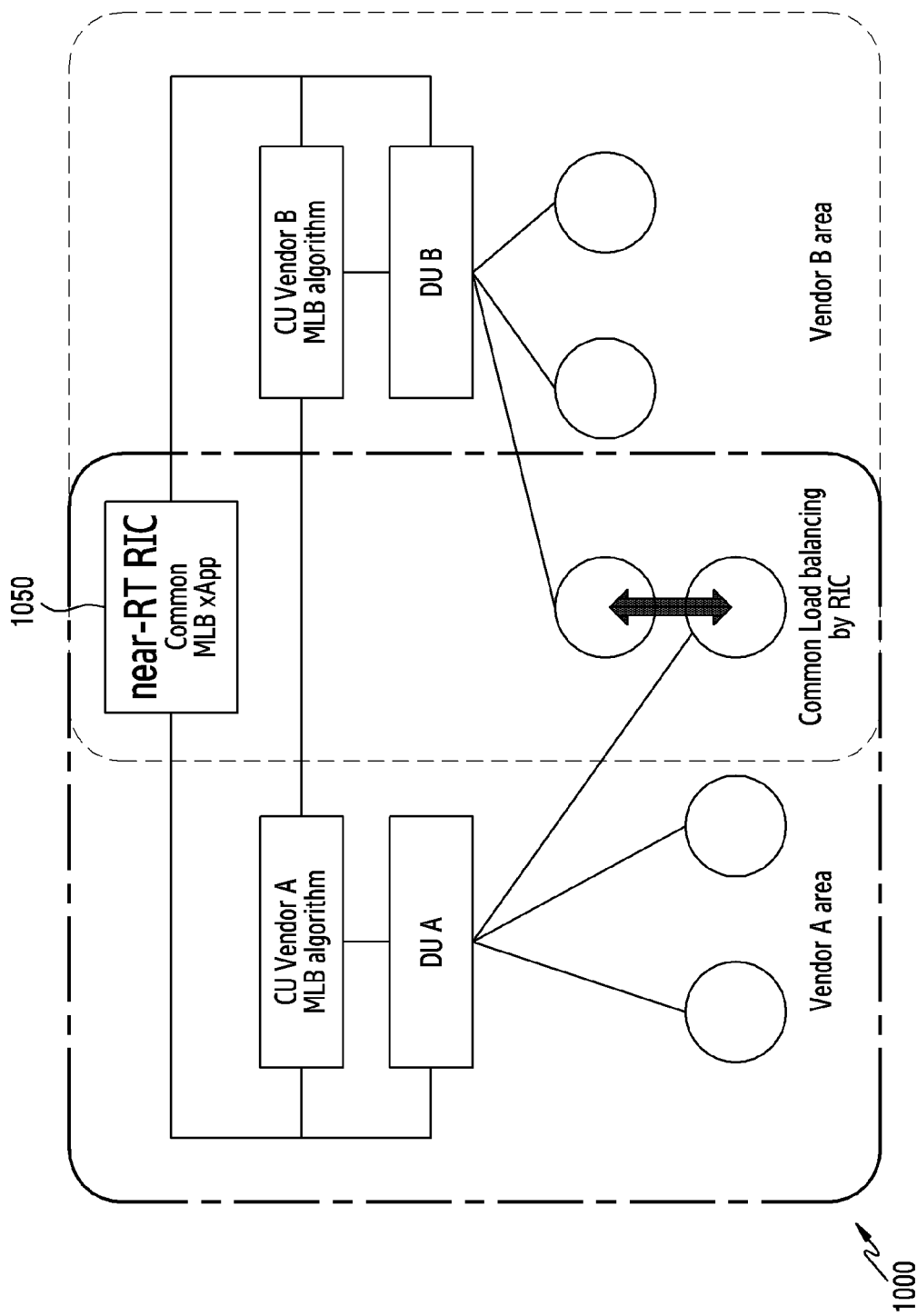
FIG. 10 is a view illustrating an example of mobility load balancing (MLB) control for different vendors according to an embodiment of the disclosure.

FIG. 10 illustrates an example of mobility load balancing (MLB) control for different vendors according to an embodiment of the disclosure.

Referring to FIG. 10, the MLB may be performed by RRM control. A first CU and a first DU may be provided by a vender A. A second CU and a second DU may be provided by a vendor B. The first DU may provide a service area of the vendor A. RUs connected with the first DU may provide the service area of the vendor A. The second DU may provide a service area of the vendor B. RUs connected with the second DU may provide the service area of the vendor B.

When a terminal moves, it may be determined which cell is optimal through load balancing. When load balancing is performed by different vendors, it may be difficult to smoothly perform load balancing in a space where service areas of the vendors overlap one another. That is, interworking between vendors may be required to be performed in an inter-vendor zone or an inter CU-CP area. For interworking between vendors, RRM control may be required to be performed in a centralized form. Accordingly, a RIC according to various embodiments of the disclosure may be configured to perform RRM. The RIC may not only receive measurement from each E2 node but also generate a message for controlling each E2 node. The RIC may transmit a control message to each E2 node (for example, a DU or CU-CP, CU-UP).

Figure 11A:
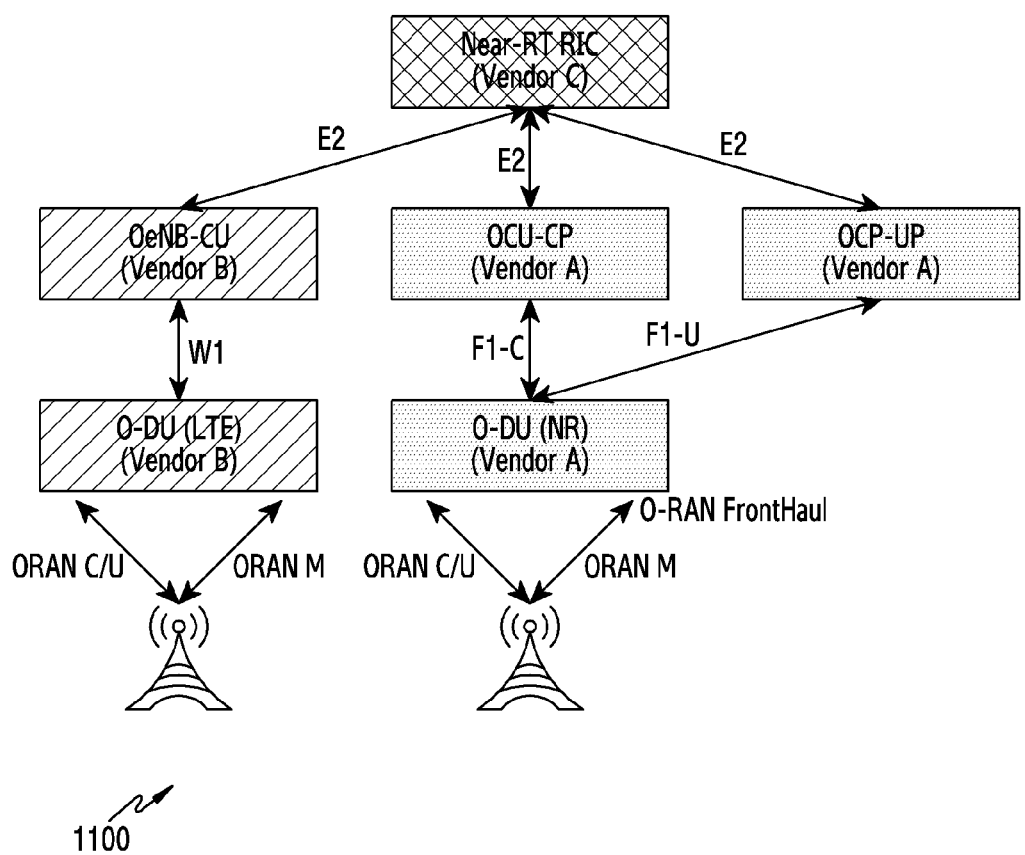
FIG. 11A is a view illustrating an example of MLB control for different vendors according to an embodiment of the disclosure.

FIG. 11A illustrates an example of MLB control for different vendors according to an embodiment of the disclosure. When a single vendor operates unlike in FIG. 11A, a RAN context may be identified at a Near-RT RIC. In addition, trigger event/REPORT, INSERT, POLICY conditions may be activated. A control action may also be performed and a normal sub function definition approach method may also be performed. However, when multi-vendors operate as shown in FIG. 11A, a RAN context may be identified at the Near-RT RIC. In addition, the trigger event/REPORT, INSERT, POLICY conditions may not be activated. A control action may not be performed or may depend on implementation due to collision of local RRM.

Single E2SM-RAN control may be difficult to normally perform in an O-RAN situation of a multi-vendor environment. This is because there are a function p arity and an operation parity when all RAN features are considered. The RAN function parity refers to a difference in features related to RRM functions (for example, quality of service (QoS) handover, load balancing (LB) handover, etc.). The RAN operation parity refers to a difference in features related to RAN operations (for example, an EN-DC SCG bearer change procedure). In addition, operations regarding REPORT/INSERT/CONTROL/POLICY may not identify an exact RAN CONTEXT. In addition, REPORT/INSERT/CONTROL/POLICY operations may not identify trigger event/conditions according to REPORT/INSERT/POLICY. In a corresponding operation, it may be difficult to refer to the RAN context in a specific deployment.

Referring to FIG. 11A, a wireless communication environment 1100 illustrates network entities which are configured through three vendors in total. A vendor A may be an NR supplier. A vendor B may be an LTE supplier. A vendor C may be a RIC supplier. To solve the above-described problems, one entity that manages all vendors when E2 nodes of any vendor are connected is required. Since the near-RT RIC may collect measurement information of vendors even if the vendors are different, the near-RT RIC may perform management and control more easily than other entities. Accordingly, the near-RT RIC may solve problems of a difference and compatibility between vendors by performing RRM in a centralized manner. In addition, even in the case of different RATs, problems of a difference and compatibility between vendors may be solved.

Hereinafter, RRM performed by the near-RT RIC in a centralized manner may be referred to as a zombie mode of RIC-based RRM control or E2 node, a zombie mode of E2SM-RIC, an E2SM-RIC dedicated mode. Technical meanings indicating that functions of each E2 node are performed instead by the RIC may be used in replacement of the above-mentioned terms.

Figure 11B:
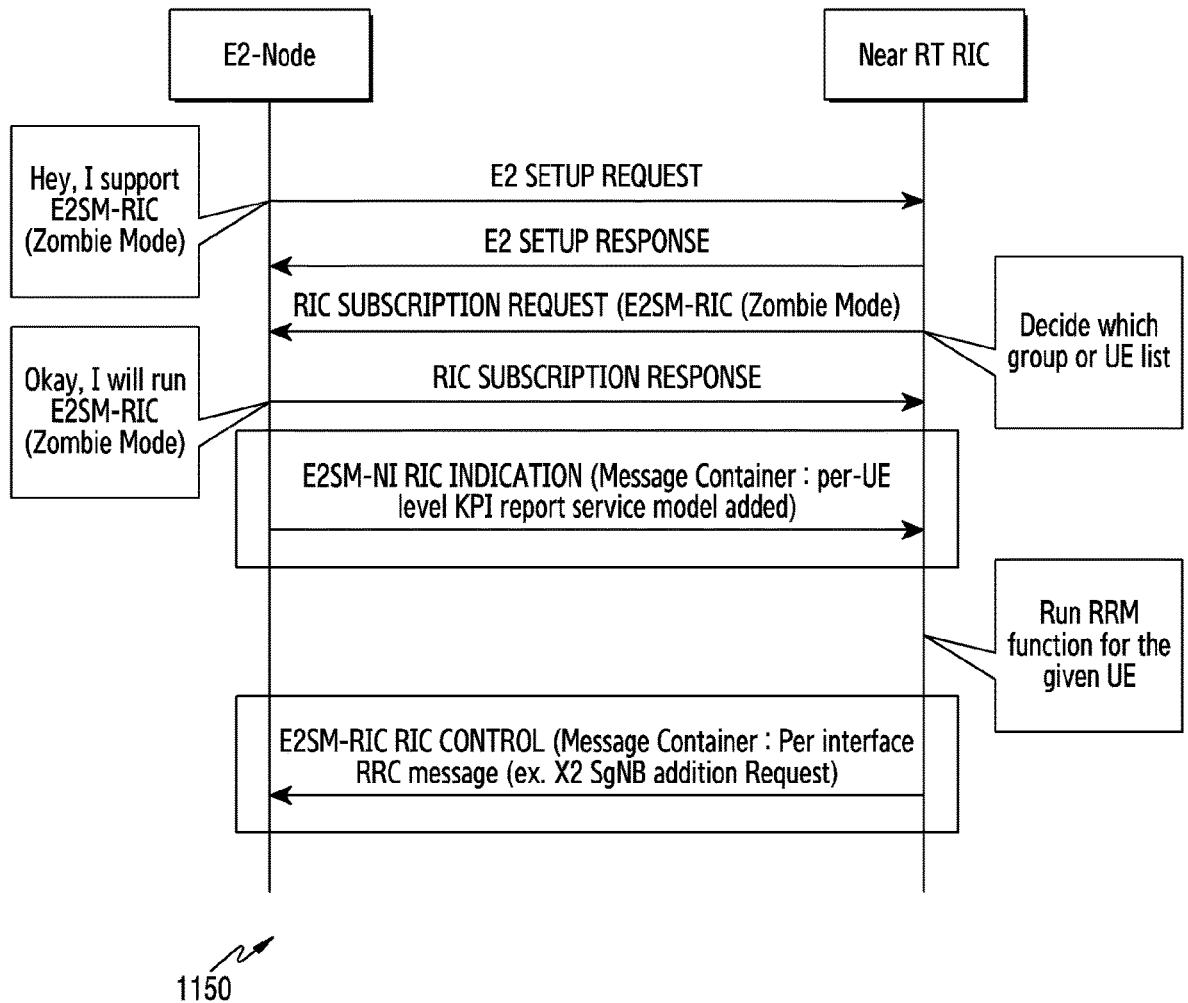
FIG. 11B is a view illustrating signaling for setting radio resource management (RRM) control of a near-RT RIC according to an embodiment of the disclosure.

FIG. 11B illustrates signaling for setting RRM control of a near-RT RIC according to an embodiment of the disclosure. FIG. 11B illustrates an example of a signaling procedure between an E2 node and a RIC. Specifically, FIG. 11B illustrates a setup procedure of E2 I/F and a RIC subscription message transmission procedure between the E2 node and the RIC. In addition, FIG. 11B illustrates a procedure of transmission of a RIC indication message and a RIC control message.

Referring to FIG. 11B, in a wireless communication environment 1150 illustrates the E2 node may transmit an E2 setup request (SET UP REQUEST) message to the RIC. An E2 NODE FUNCTION located at the E2 node may find the RIC by using an IP address of the RIC which is set by operation-administration-maintenance (OAM), and may transmit the E2 setup request message. In this case, the E2 node may request RIC-based RRM control. For example, the E2 node may transmit, to the RIC, an E2 setup request (SET UP REQUEST) message including information indicating that the E2 node may operate in the zombie mode. At the next step, the RIC may receive an E2 setup response (E2 SETUP RESPONSE) message from the E2 node. The RIC may determine whether the E2 node is able to support the zombie mode, in other words, whether it is possible to perform full RRM control by the RIC, based on information from the E2 node.

Referring to FIG. 11B, the RIC may transmit a subscription request (RIC SUBSCRIPTION REQUEST) message to the E2 node. Specific xApp located at the RIC may request a RIC E2 termination function to subscribe to a specific RAN Function Definition function supported by E2. According to an embodiment, the subscription request message may include information for indicating whether the RIC performs RIC-based RRM control. For example, the subscription request message may include information for indicating whether the RIC operates as an E2SM-RIC. For example, the RIC may transmit a subscription request message including a zombie mode indicator. According to an embodiment, the RIC-based RRM control may be performed in the unit of a terminal or a terminal group including terminals. As shown in FIGS. 10 and 11A, the RIC-based RRM control may be performed for a terminal positioned in an inter vendor zone or a common service area of CU-UPs, or a group including the terminal. In this case, the subscription request message may include an ID for indicating a group (hereinafter, a group identifier) or an ID for indicating a specific terminal (hereinafter, a terminal ID/UE ID).

Referring to FIG. 7, the subscription request message and the E2 setup response message may be separately transmitted. According to another embodiment, the subscription request message at the step may be included in the E2 SETUP RESPONSE MESSAGE at the step and may be transmitted all together.

At the next step, the E2 node may transmit a subscription request response (RIC SUBSCRIPTION RESPONSE) to the RIC. The E2 node function of the E2 node may decode the subscription request message. The E2 node may identify whether the RIC is an E2SM RIC. The E2 node may identify whether the RIC operates in the zombie mode or whether the E2 node operates in the zombie mode.

Referring to FIG. 11B, the E2 node may transmit an E2 RIC indication message to the RIC. The E2 node and the RIC may perform a RIC indication procedure. According to embodiments of the disclosure, the RIC indication message may include a KPI report of a UE unit. According to an embodiment, a message container of the RIC indication message may include a KPI report service model of a UE unit. Thereafter, the RIC may perform RRM with respect to corresponding UE. The RIC may perform RRM and may generate a control message including detailed information related to a resource allocation procedure although this is not illustrated in FIG. 11B. Through this, the RIC may control each E2 node.

An E2SM RIC CONTROL message may be transmitted to the E2 node 610. The E2 node 610 and the RIC 640 may perform a RIC control procedure. The RIC 640 may generate an E2SM-RIC RIC control message for the control procedure of the E2 node. For example, the E2SM-RIC RIC control message may include a message container. The message container may include an RRC message (for example, an X2 SgNB additional request message) for each interface.

Referring to FIG. 11B, it is illustrated that RRC control is performed in the unit of UE, but measurement may be performed and reported in various units such as a group of UE/network slice, and RIC control may be performed.

FIG. 11B illustrates the SET UP procedure, the RIC subscription procedure, the RIC indication message transmission procedure, the RIC control message transmission procedure in sequence. However, various embodiments of the disclosure are not limited to the above-described sequence, procedure. That is, in some embodiments, the E2 node and the RIC may independently perform E2 setup procedures. In some embodiments, the E2 node and the RIC may independently perform subscription procedures. According to another embodiment, the E2 setup response message may include the subscription request message as described above. In some embodiments, the E2 node and the RIC may independently perform RIC indication procedures. In some embodiments, the E2 node and the RIC may independently perform RIC control procedures. In addition, the E2 node and the RIC may perform at least some of the above-described procedures all together or individually.

Figure 12A:
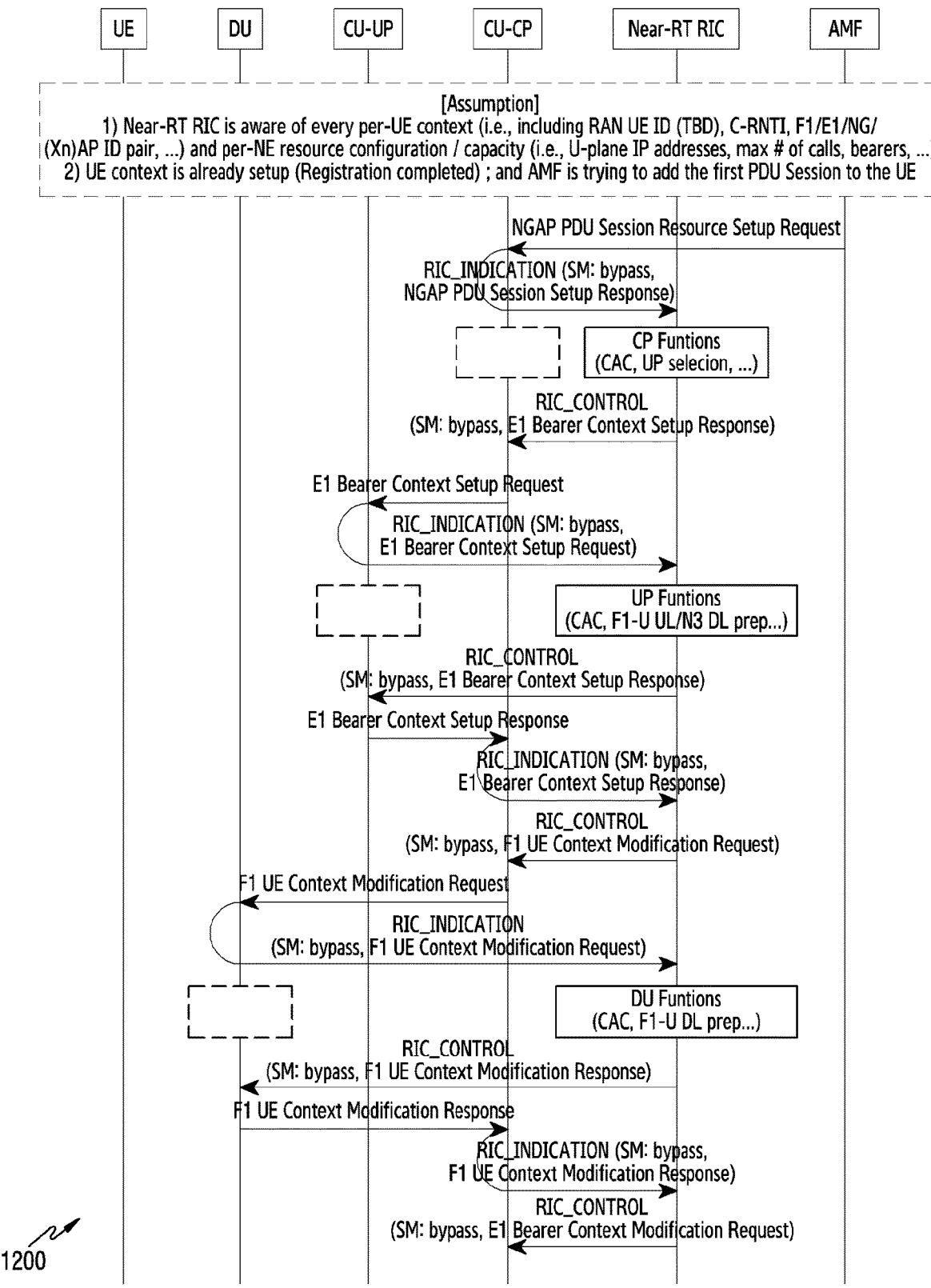
FIGS. 12A and 12B are views illustrating signaling for RIC-based RRM control according to various embodiments of the disclosure.
Figure 12B:
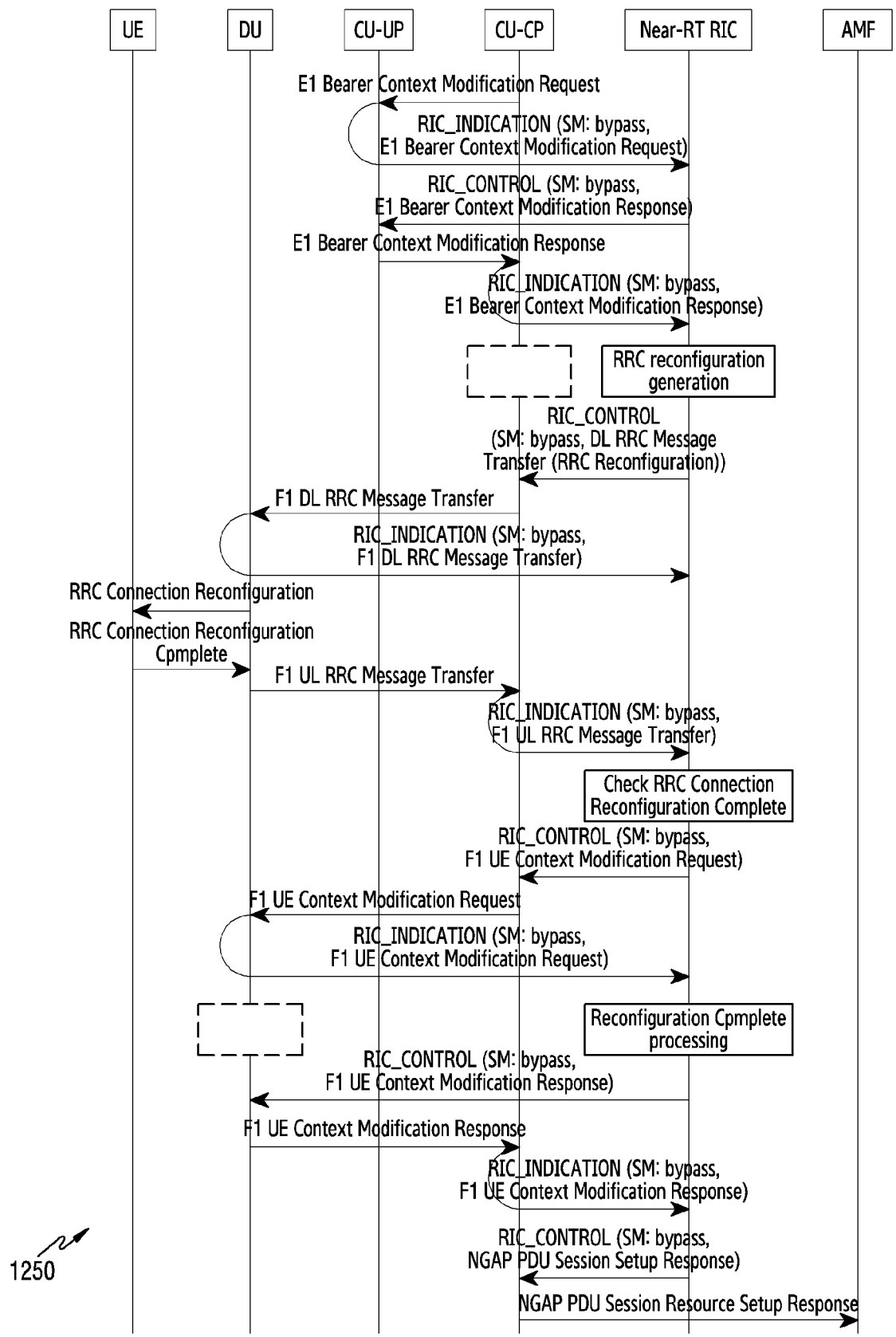

FIGS. 12A and 12B illustrate signaling for RIC-based RRM control according to various embodiments of the disclosure. Load balancing (for example, MLB) between different vendors may be performed through RRM control. Although FIGS. 12A and 12B illustrate a single E2 node, signaling may be equally applied to a plurality of E2 nodes, particularly, E2 nodes of different vendors. Even when vendors are different, RRM control may be more efficiently performed through CONTROL by the RIC.

Referring to FIGS. 12A and 12B, in method 1200 and 1250, the RIC may process the following messages/procedures in order to perform functions of the E2 node instead:

(1) NGAP PDU Session Resource Setup Request
(2) E1 bearer Context Setup Request
(3) E1 bearer Context Setup Response
(4) F1 UE Context Modification Request
(5) F1 UE Context Modification Response
(6) E1 Bearer Context Modification Request
(7) E1 Bearer Context Modification Response
(8) DL RRC Message Transfer
(9) F1 UE RRC Message Transfer
(10) F1 UE Context Modification Request
(11) F1 UE Context Modification Response
(12) NGAP PDU Session Resource Setup Response When an AMF transmits a message to the E2 node, the E2 node may transmit the corresponding message to the RIC. That is, in order for the RIC to interpret/process/determine the corresponding message, the E2 node may transmit the corresponding message to the RIC by bypassing. Blank box shown in FIGS. 12A and 12B indicate that existing functions that should be performed by each E2 node are performed by the near-RT RIC instead. The RIC may enhance an intelligence-aided function in order to perform operations for RRM, such as interpreting/processing/determining of a message.

FIGS. 12A and 12B illustrate signaling in chronological sequence, but this is merely for explaining operations of the E2SM-RIC according to various embodiments of the disclosure, and does not mean that specific signaling is an essential element and should be performed before other signaling. That is, according to another embodiment, some of the procedures shown in FIGS. 12A and 12B may be omitted. According to still another embodiment, some signaling may be performed at a time by the RIC. FIGS. 12A and 12B illustrate an example of processing messages (1) to (12) described above, but embodiments of the disclosure are not limited thereto. Some of the above-described examples may be interpreted/determined/processed by the RIC, but the other examples may be performed by the E2 node as in a related-art method.

Hereinafter, a setup procedure and a subscription procedure, and a UE ID list REPORT procedure to perform a RIC control procedure between an E2 node and a RIC according to embodiments of the disclosure will be described with reference to FIGS. 13A and 13B.

Figure 13A:
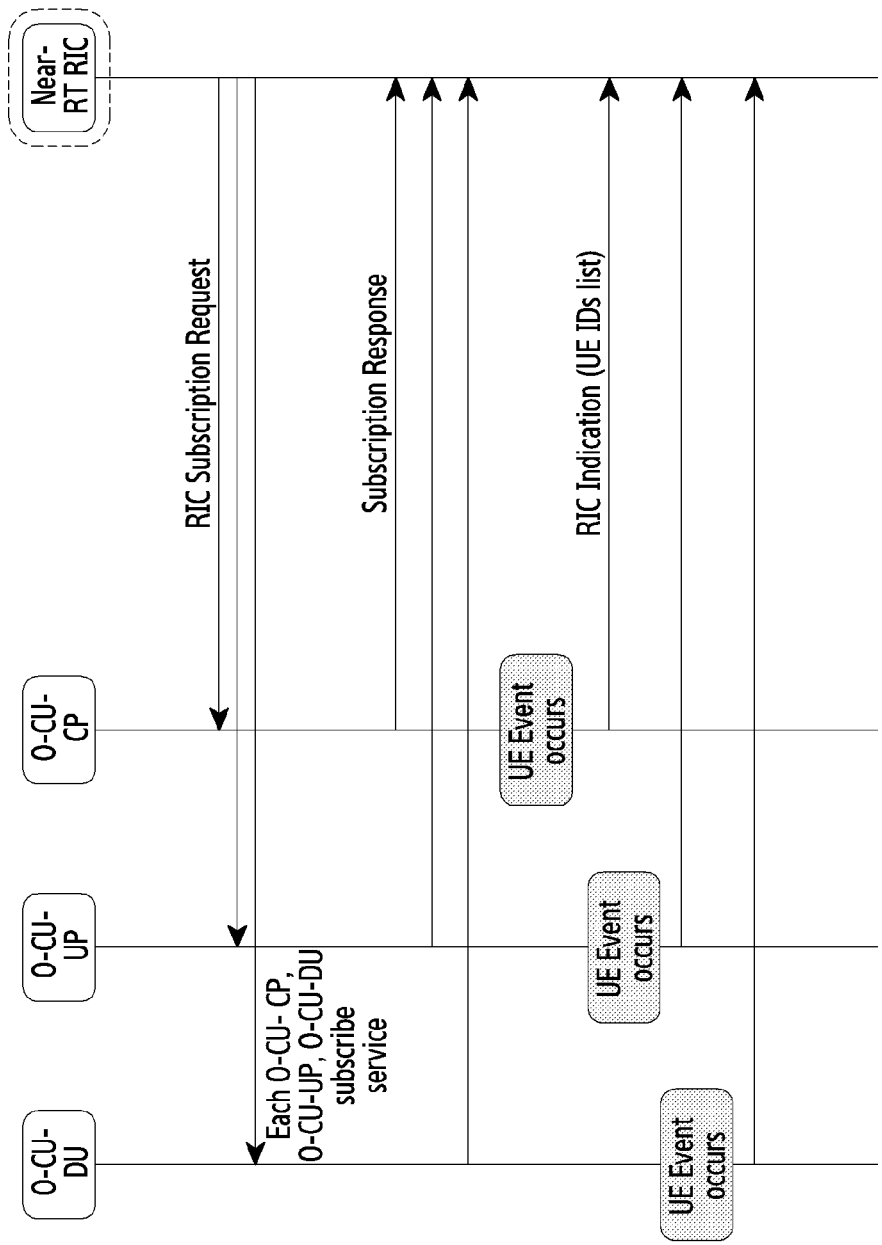
FIG. 13A is a view illustrating signaling of a subscription procedure and a RIC indication between an E2 node and a RIC according to an embodiment of the disclosure.

FIG. 13A illustrates signaling of a subscription procedure and a RIC indication between the E2 node and the RIC according to an embodiment of the disclosure. FIG. 13A illustrates a subscription procedure and a RIC indication (REPORT) procedure between the E2 node and the RIC according to embodiments of the disclosure.

According to an embodiment, the RIC may transmit a RIC subscription request message (RIC Subscription Request) to the E2 node. The E2 node may be an O-CU-CP, an O-CU-UP, or an O-CU-DU. The E2 node may transmit a RIC subscription response message (RIC Subscription Response) to the RIC.

Referring to FIG. 13A, when a defined event occurs, the E2 node may transmit a RIC indication message to the Near RT RIC. Each E2 node may identify an event set for the corresponding E2 node through the subscription procedure. The RIC indication message may include a UE ID list. The UE ID list may include one or more UE IDs.

Figure 13B:
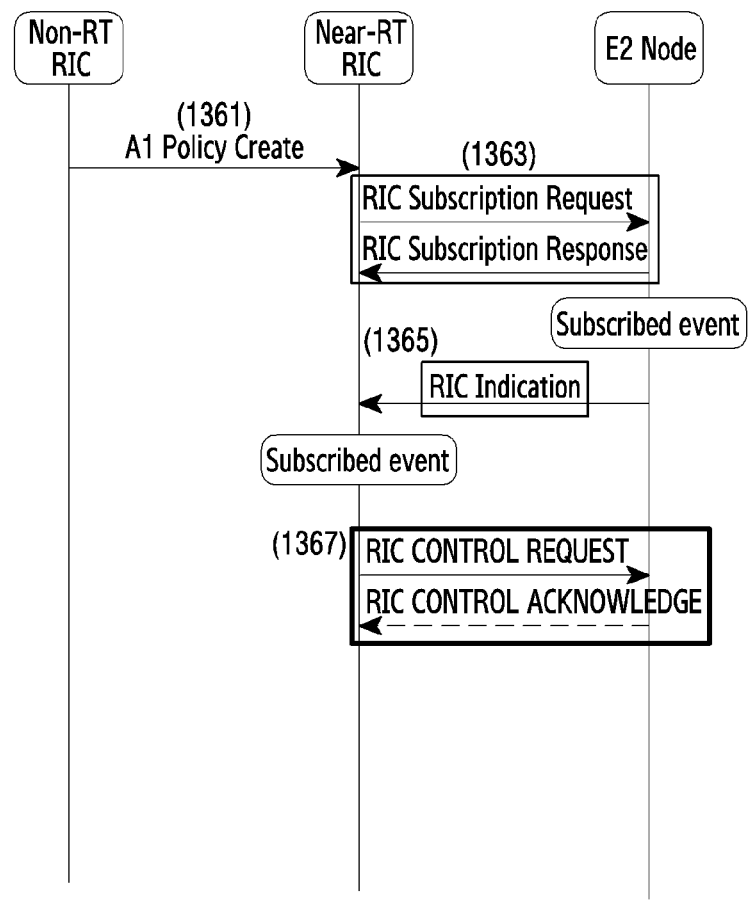
FIG. 13B is a view illustrating signaling of a control procedure between the E2 node and the RIC according to an embodiment of the disclosure.

FIG. 13B illustrates signaling of a control procedure between an E2 node and a RIC according to an embodiment of the disclosure. FIG. 13B illustrates a whole message flow between the E2 node and the RIC, and a non-RT RIC according to embodiments of the disclosure, and illustrates a procedure in which the E2 node reports a UE ID list by using a RIC Indication message according to embodiments of the disclosure.

Referring to FIG. 13B, at operation 1361, the Non-RT RIC may transmit, to the RIC, a policy for the Near-RT RIC to control the E2 Node by using an A1 interface. The A1 interface may be defined between the Non-RT RIC and the Near RT RIC. The A1 policy may include at least one of a policy for each UE, a policy for each group, a policy for each cell, a policy for each slice, and may be configured variously according to a service. The RIC may perform a RIC subscription procedure based on the A1 policy which is received through an A1 policy message. An A1 policy create message may include, for example, a JavaScript Object Notation (JSON) message format. For example, when a policy for specific UE is set, the A1 policy create message may include a UE ID. In addition, when a policy for a specific cell is set, the A1 policy create message may include a cell ID. For example, when QoS is controlled, the A1 policy create message may include a GBR related to QoS.

At operation 1363, the RIC may transmit a RIC subscription request message (RIC Subscription Request) to the E2 node. The E2 node may transmit a RIC subscription response message (RIC Subscription Response) to the RIC. The RIC may write the RIC Subscription request in the subscription procedure. The RIC Subscription request may be a message for setting a SERVICE for substantially controlling the E2 node. In order to control the E2 node, the RIC may normally request subscription to a REPORT service and a CONTROL service for receiving measurement, UE ID list from the E2 node. According to an embodiment, a specific xApp positioned in the RIC may request a RIC E2 termination function to subscribe to a specific RAN Function Definition function supported in the E2. An E2 node function of the E2 node may decode the subscription request message. After successfully setting an event condition requested from the E2 node function by the RIC, the E2 node function of the E2 node may transmit, to the RIC, information indicating that an event trigger condition is successfully set through a response (RIC Subscription Response) to the subscription request.

In order to subscribe to the REPORT service and the CONTROL service, one RIC subscription procedure (one RIC Subscription Request and RIC Subscription Response) may be used. However, in a different way, the RIC Subscription Request and the RIC Subscription Response may be exchanged between the RIC and the E2 node in order to subscribe to the REPORT service, and the RIC Subscription Request and the RIC Subscription Response may be additionally exchanged between the RIC and the E2 node in order to subscribe to the CONTROL service.

At operation 1365, the E2 node may transmit a RIC indication (or a RIC Policy Indication) to the RIC. When a designated event occurs in the subscribed REPORT SERVICE at operation 1363, the E2 node may include relevant measurement data, UE state information, UE ID list in the RIC Indication message, and may transmit the RIC indication message to the RIC. For example, when a specific event condition occurs, the E2 node 610 may transmit an E2 RIC indication message to the RIC 640. According to an embodiment, a message container of the RIC indication message may include a KPI report service model of a UE unit, UE ID list information, etc.

At operation 1367, the RIC may perform a RIC control procedure. The RIC may transmit a control request message (RIC CONTROL REQUEST) to the E2 node. The E2 node may transmit a RIC control acknowledgement (RIC CONTROL ACKNOWLEDGE) to the RIC.

Figure 14A:
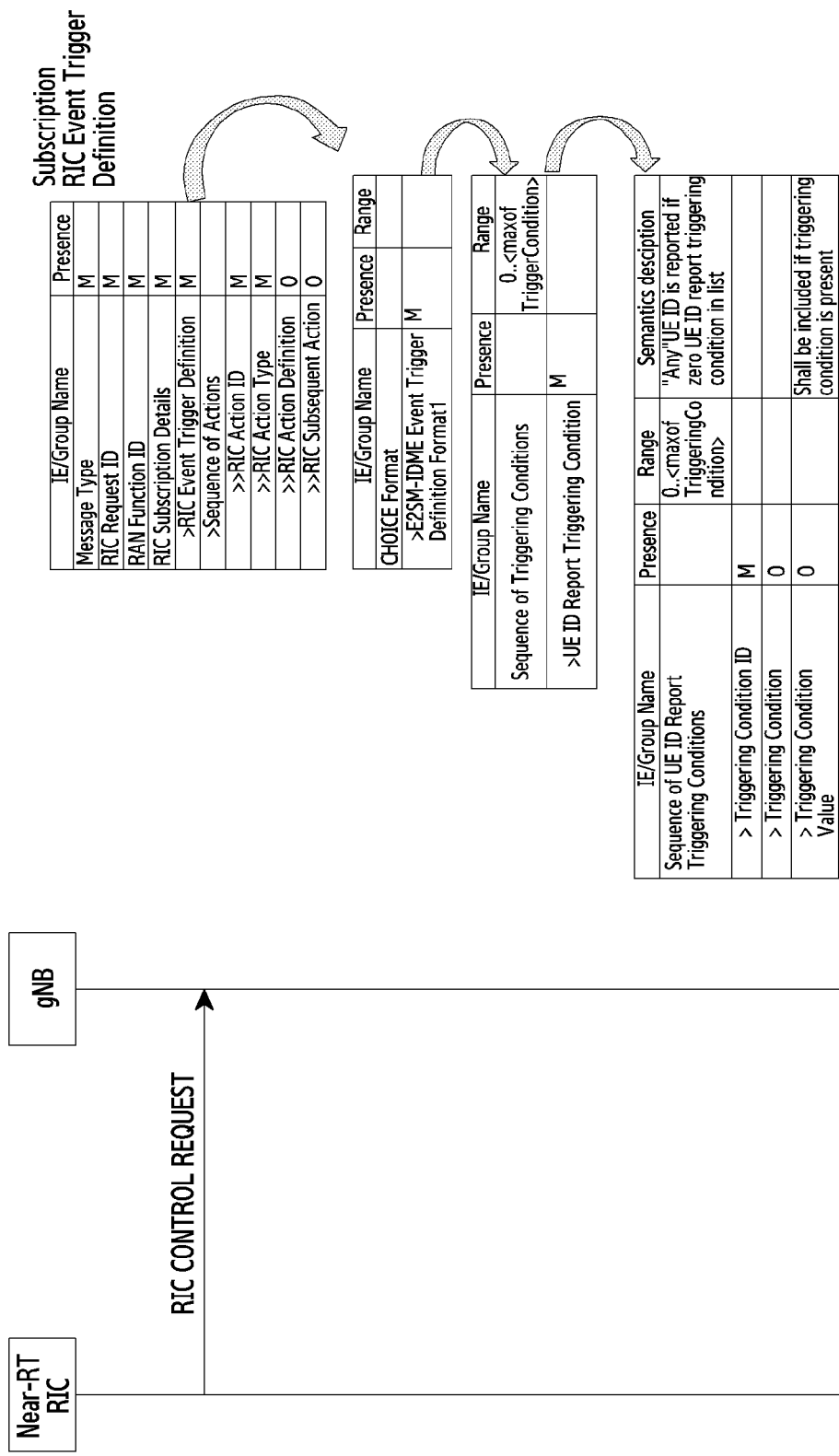
FIG. 14A is a view illustrating an example of a format of a RIC event trigger definition according to an embodiment of the disclosure.

FIG. 14A illustrates an example of a format of a RIC event trigger definition according to an embodiment of the disclosure. FIG. 14A illustrates an example of a RIC service subscription request (RIC Subscription Request) procedure and messages according to embodiments of the disclosure.

Referring to FIG. 14A, a near-RT RIC may transmit a RIC subscription request message to a base station (for example, gNB). The RIC subscription request message may include a message type, a RIC request ID, a RAN function ID, RIC subscription details.

Information on the RIC subscription details according to embodiments of the disclosure may include a RIC event trigger definition. That is, FIG. 14A illustrates a format of a RIC Event Trigger Definition in a RIC SUBSCRIPTION REQUEST message specified in O-RAN standards. The RIC Event Trigger Definition may be defined according to a SERVICE MODEL supported by each RIC and RAN. Embodiments of the disclosure suggest a procedure of selecting an ID LIST of a terminal satisfying a TRIGGERING CONDITION among UE IDs which vary according to a UE state of the RAN.

A Message Type of the Subscription message is a type number specified in standards according to each message type. A RIC Request ID is a unique ID for managing a corresponding message in the RIC. A RAN Function ID is an ID for identifying a FUNCTION which is a target of CONTROL at the E2 node. A RIC Event Trigger Definition IE is message details and is defined in the form of Event Trigger Definition Format defined in the Service Model. In the disclosure, the IE regarding the Event Trigger Definition Format is exemplified as E2SM-IDM Event Trigger Definition Format 1, but the IE name may vary according to a Service Model.

Event Trigger Definition Format 1 according to embodiments of the disclosure may indicate a condition list for designating a terminal of a specific group, and in the disclosure, a corresponding IE is exemplified as a UE ID Report Triggering Condition, but the IE name may vary according to a Service Model. The UE ID Report Triggering Condition may be configured with a Triggering Condition ID designating a condition, a Triggering Condition specifying a relationship of a condition, and a Triggering Condition Value specifying a condition value. For example, the Triggering Condition ID may be defined for an NGAP Interface specified in 3GPP standards with a service profile identifier (SPID) or a value. The Triggering Condition may be interpreted in an arithmetical/logical method with respect to a condition value, like Equal, Greater than, Less than, Present, etc. The Triggering Condition Value may be used as a comparison value when arithmetical/logical calculation is performed, and may be deleted according to circumstances. Detailed examples are as follows:

TABLE 1

| If Triggering Condition (SPID) | "Equal" | (Triggering Condition Value, '255') |
| If Triggering Condition (SPID) | "Greater Than" | (Triggering Condition Value, '5') |

Figure 14B:
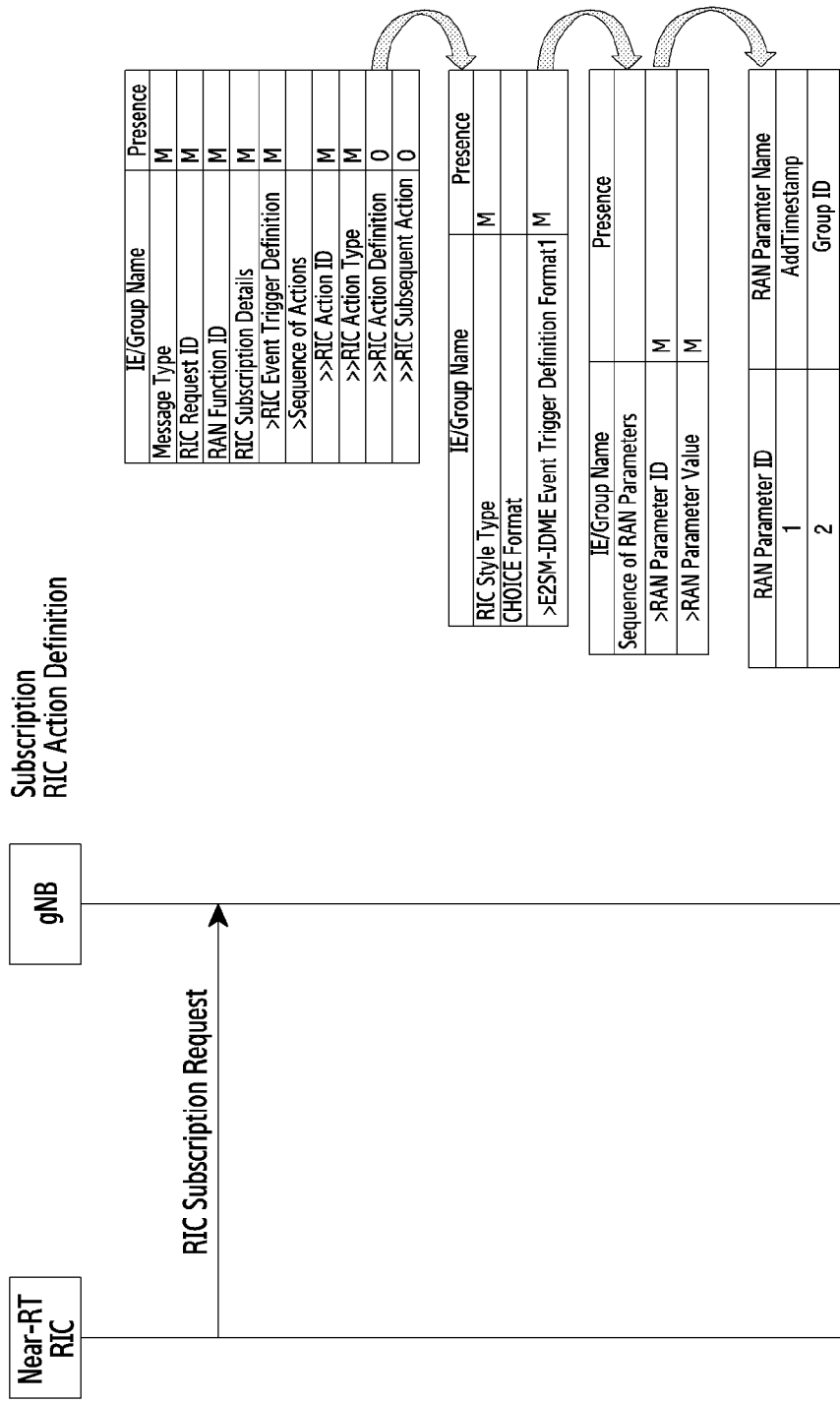
FIG. 14B is a view illustrating an example of a format of a RIC action definition according to an embodiment of the disclosure.

FIG. 14B illustrates an example of a format of a RIC Action Definition according to an embodiment of the disclosure. FIG. 14B illustrates an example of a RIC Action Definition in a RIC service subscription request (RIC Subscription Request) procedure according to embodiments of the disclosure.

Referring to FIG. 14B, a near-RT RIC may transmit a RIC subscription request message to a base station (for example, gNB). The RIC subscription request message may include a message type, a RIC request ID, a RAN function ID, RIC subscription details. The RIC Action Definition refers to a service method for the RIC to request a specific Action from the E2 node in the subscription request procedure. Each service model selectively defines an action definition in a subscription request procedure according to necessity. In the disclosure, E2SM-IDM Action Definition Format 1 is defined. Format 1 is configured with a RAN Parameter ID and a RAN Parameter Value, and in an example of the disclosure, AddTimestamp and two parameters of the Group ID are defined. AddTimestamp may be used to request the E2 node to selectively add Timestamp in a RIC REPORT service (RIC Indication) procedure. The Group ID may be selected by the E2 Node in the RIC service Subscription Request Procedure, and may be controlled to be carried and to be transmitted to the RIC.

Figure 15:
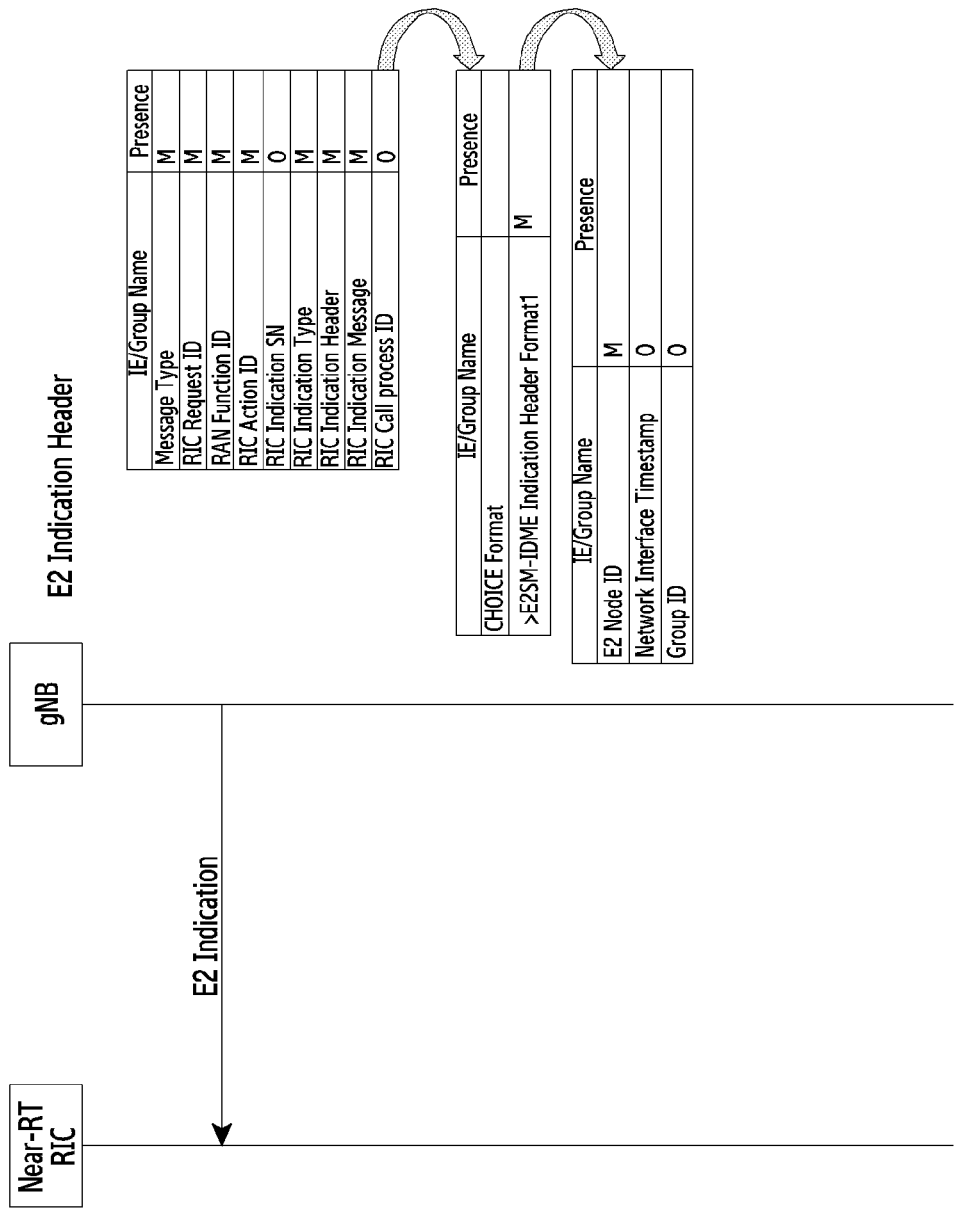
FIG. 15 is a view illustrating an example of a format of a RIC indication header according to an embodiment of the disclosure.

FIG. 15 illustrates an example of a format of a RIC indication header according to an embodiment of the disclosure.

Referring to FIG. 15, an example of a RIC Indication Header message in a RIC REPORT service (RIC Indication) procedure according to embodiments of the disclosure is illustrated.

Referring to FIG. 15, a base station (for example, gNB) may transmit an E2 RIC indication message to a Near-RT RIC. A RIC Indication message specified in O-RAN standards may include RIC Indication header information. The RIC Indication message may vary according to an E2 service model, and may be defined according to the E2 service model. A RIC Indication Header may include an E2SM Indication header format which is defined as a detailed message in a service model. The RIC Indication Header according to embodiments of the disclosure may be defined as E2SM-IDM Indication Header Format 1. Detailed E2SM-IDM Indication Header Format 1 may include an ID of the E2 node which transmits the E2 Indication message, a Network Interface Timestamp, and a Group ID. Herein, the Network Interface Timestamp and the Group ID may be items that are requested by the RIC in E2SM-IDM Action Definition Format 1 of FIG. 14B. The E2 node may transmit the Network Interface Timestamp and the Group ID to the Near-RT RIC through the E2 Indication header.

FIGS. 16A, 16B, 16C, and 16D illustrate examples of a format of a RIC indication message according to various embodiments of the disclosure.

Referring to FIGS. 16A to 16D, an E2 node (for example, gNB) may transmit an E2 indication message to a Near-RT RIC. gNB is illustrated as an example of the E2 node, but embodiments of the disclosure are applied to any E2 node that is defined as an E2 interface with a RIC, such as eNB, ng-eNB, en-gNB, O-CU, O-DU, O-CU-CP, O-CU-UP.

The E2 indication message may include a message type, a RIC Request ID, a RIC Function ID, a RIC Action ID, a RIC Indication SN (optional), a RIC Indication Type, a RIC Indication Header, a RIC Indication message, a RIC Call process ID (optional). The RIC Indication message may include a UE ID defined according to an E2SM-IDM indication format.

Figure 16A:
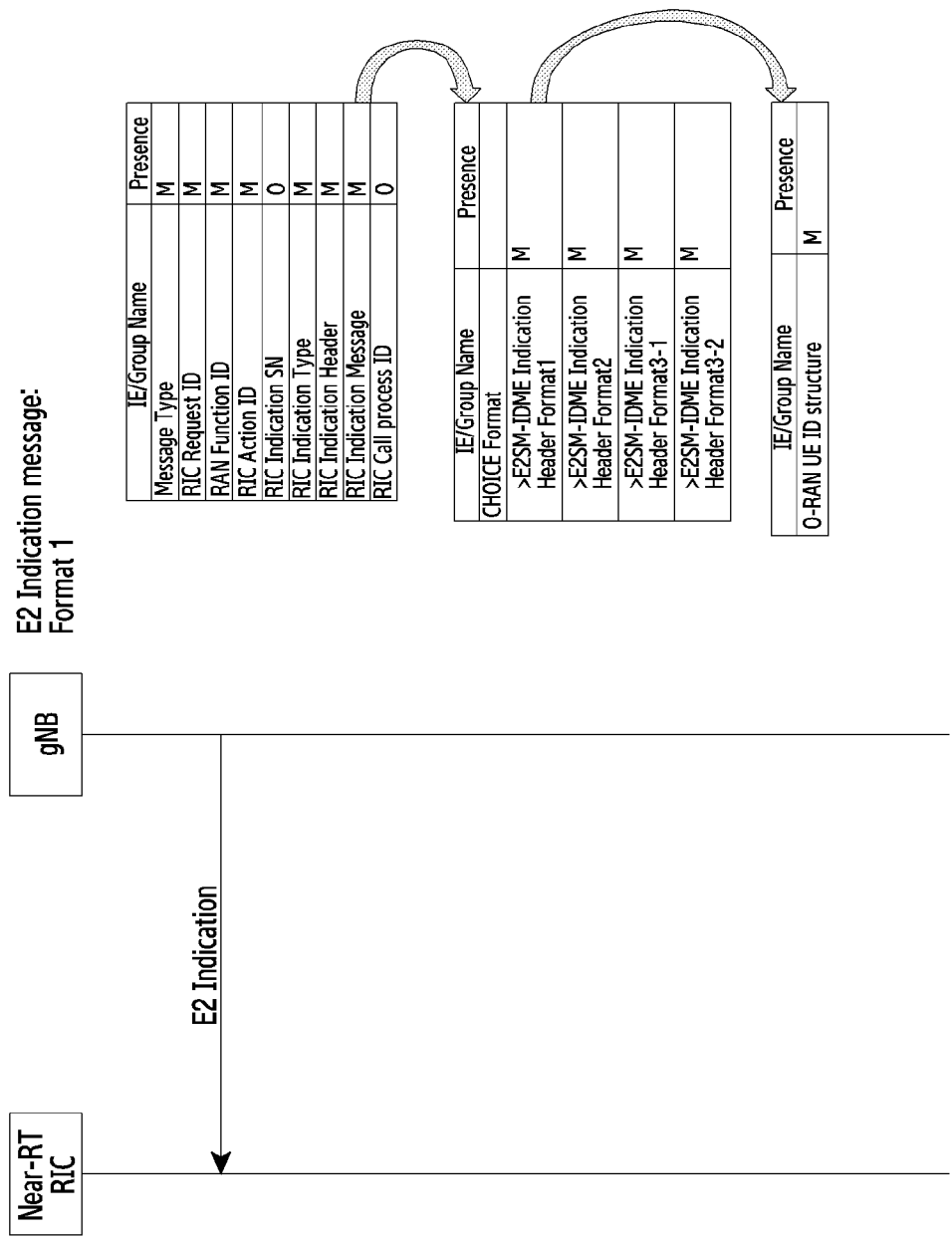
FIGS. 16A, 16B, 16C, and 16D are views illustrating examples of a format of a RIC indication message according to various embodiments of the disclosure.

Referring to FIG. 16A, according to embodiments of the disclosure, in the case of E2SM-IDM indication format 1, the RIC indication message may include an O-RAN UE ID structure. The IE of the O-RAN UE ID structure ("0-RAN UE ID structure") may have a format that is designed to include all types of UE IDs defined in the E2 node. The O-RAN UE ID structure may be used in a call setup procedure. According to an embodiment, the O-RAN UE ID structure may be a format of FIGS. 17AX and 17AY.

According to an embodiment, in a disaggregated gNB, gNB-CU-CP, gNB-CU-UP, gNB-DU may transmit an E2 indication message including a UE ID to each Near-RT RIC in order to set a call. In addition, in order to add a PDU session (or in order to add CU-UP), gNB-CU-UP, gNB-CU-UP #2 may transmit an E2 indication message including a UE ID to the Near-RT RIC, respectively. In addition, according to an embodiment, in order to add a secondary node (SN) in dual connectivity (DC) (for example, SgNB Addition), gNB-CU-CP of a master node (MN), gNB-CU-CP, gNB-CU-UP, gNB-DU of the SN may transmit an E2 indication message including a UI ID to the Near-RT RIC, respectively. In this case, since the UE ID managed at the E2 node varies according to an E2 node, detailed information included in the O-RAN UE ID structure may vary according to an E2 node. Detailed descriptions will be made through FIGS. 18A to 18C.

Figure 16B:
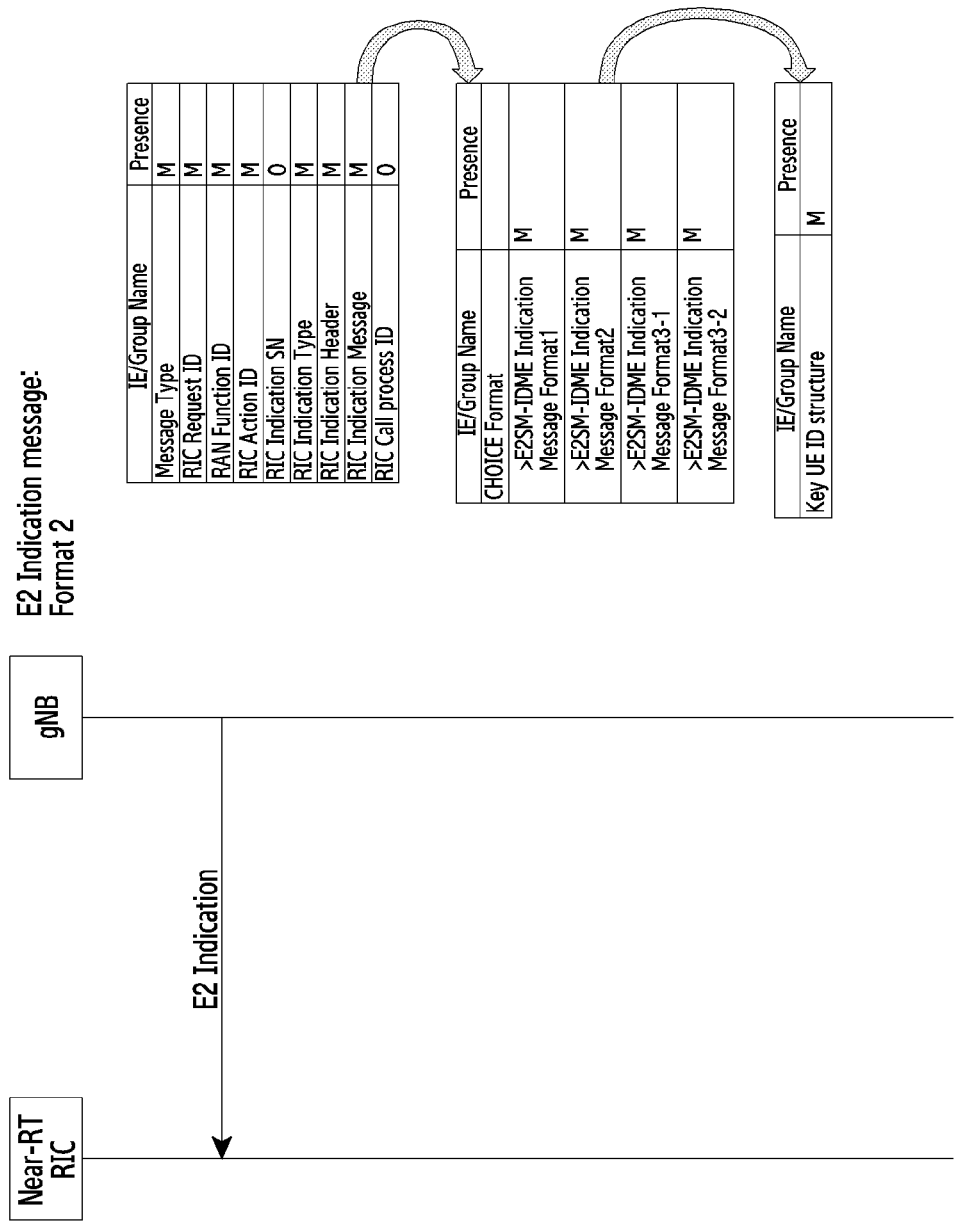

Referring to FIG. 16B, according to embodiments of the disclosure, in the case of E2SM-IDM indication format 2, the RIC indication message may include a Key UE ID structure. The IE of the Key UE ID structure ("Key UE ID structure") may have a format that is designated to include a UI ID which is managed at a higher node of the E2 node. The Key UE ID structure may be used in a release procedure. According to an embodiment, in a disaggregated gNB, gNB-CU-CP, gNB-CU-UP, gNB-DU may transmit an E2 indication message including a UI ID to the Near-RT RIC, respectively. According to an embodiment, in order to release a PDU session (or in order to release a slice of gNB CU-UP), gNB-CU-CP, gNB-CU-UP #2 may transmit the E2 indication message including the UE ID to the Near-RT RIC, respectively. In addition, according to an embodiment, when a secondary node (SN) is released in dual connectivity (DC), gNB-CU-CP, gNB-CU-UP, gNB-DU may transmit the E2 indication message including the UE ID to the Near-RT RIC, respectively. Like in the call setup procedure, in the release procedure, the UE ID managed at the E2 node varies according to an E2 node, and accordingly, detailed information included in the Key UE ID structure may vary according to an E2 node. Detailed descriptions will be made through FIGS. 19A to 19C.

Figure 16C:
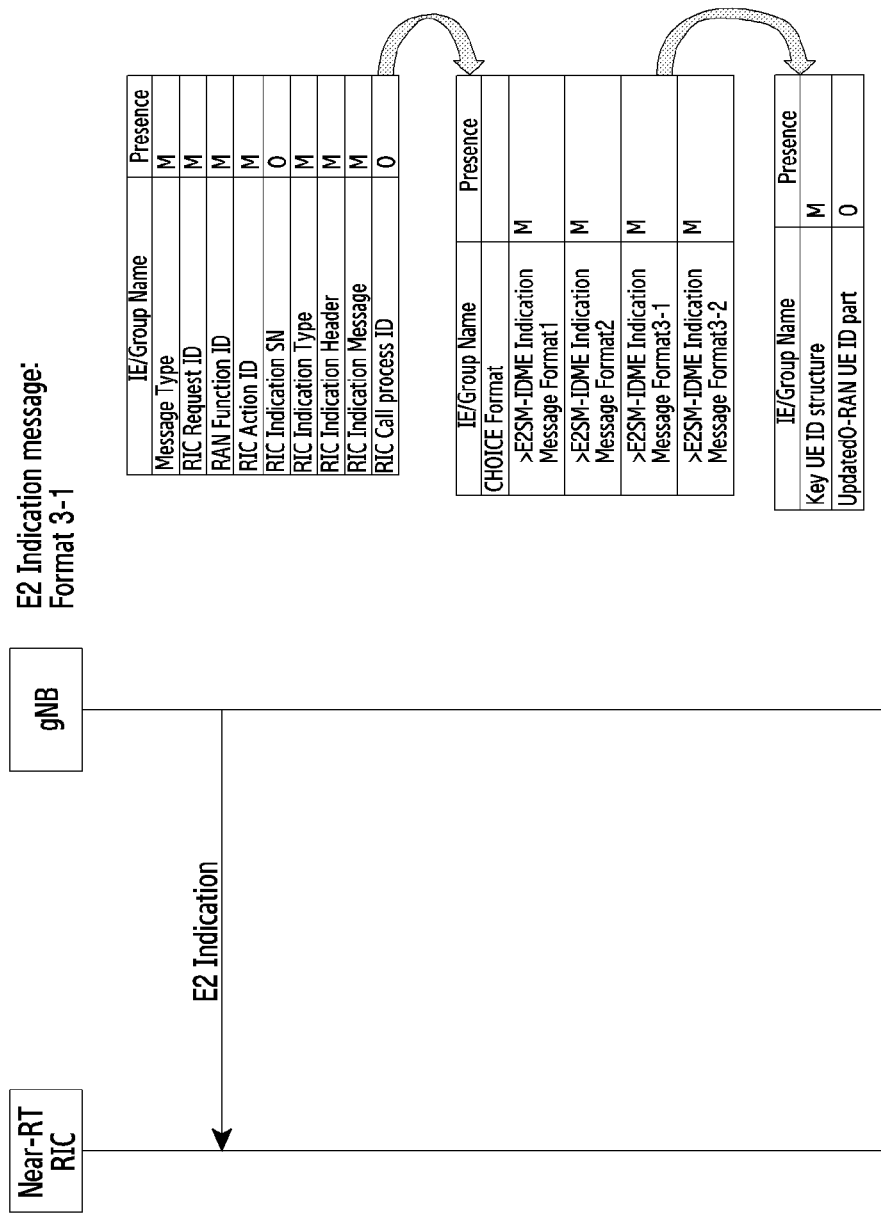

Referring to FIG. 16C, according to embodiments of the disclosure, in the case of E2SM-IDM indication format 3-1, the RIC indication message may include a Key UE ID structure and an update UE ID part. Herein, the update UE ID part refers to a format that is defined to transmit only changed information to the RIC. According to an embodiment, the Key UE ID structure may be a format of FIGS. 17BX and 17BY. In addition, according to an embodiment, the update UE ID part may be a format of FIGS. 17CX and 17CY. The RIC indication message of E2SM-IDM indication format 3-1 may be used in both of a call setup procedure or a call release procedure. To achieve this, the RIC indication message of E2SM-IDM indication format 3-1 may include an IE indicating whether an E2 node is added or released.

Figure 16D:
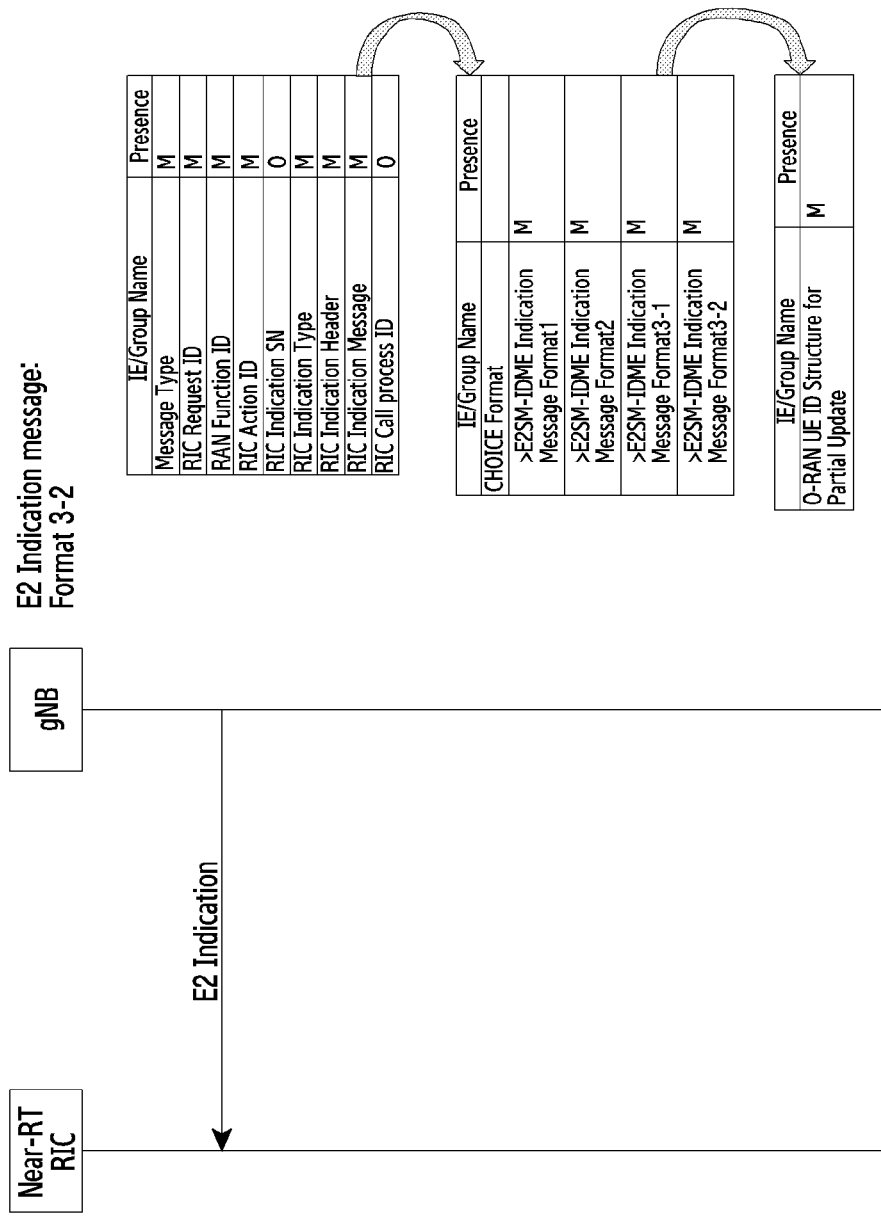

Referring to FIG. 16D, according to embodiments of the disclosure, in the case of E2SM-IDM indication format 3-2, the RIC indication message may include an O-RAN UE ID structure for partial update. The Key UE ID structure and the update UE ID part of format 3-1 are defined in separate fields, but in format 302, two pieces of information may be defined in one field. According to an embodiment, the O-RAN UE ID structure for partial update may be a format of FIGS. 17DX and 17DY. The RIC indication message of E2SM-IDM indication format 3-2 may be used in both of a call setup procedure or a call release procedure. To achieve this, the RIC indication message of E2SM-IDM indication format 3-1 may include an IE indicating whether an E2 node is added or released.

The number of the E2SM-IDM indication format according to embodiments of the disclosure is merely an example and is not interpreted as limiting embodiments of the disclosure.

FIGS. 17AX, 17AY, 17BX, 17BY, 17CX, 17CY, 17DX, and 17DY illustrate examples of an E2 service model (E2SM)-IDM indication message format according to various embodiments of the disclosure. As described above, FIGS. 17AX and 17AY illustrates a format of the O-RAN UE ID structure, FIGS. 17BX and 17BY illustrates a format of the Key UE ID structure, FIGS. 17CX and 17CY illustrates a format of the update UE ID part, and FIGS. 17DX and 17DY illustrates a message format of the O-RAN UE ID structure for partial update.

FIGS. 18A to 18C, 19A to 19C, and 20A to 20C illustrate UE ID report procedures according to various embodiments of the disclosure. A UE ID may be transmitted from an E2 node to a RIC through a RIC indication. In this case, a REPORT service may be set in transmission of the RIC Indication.

Figure 18A:
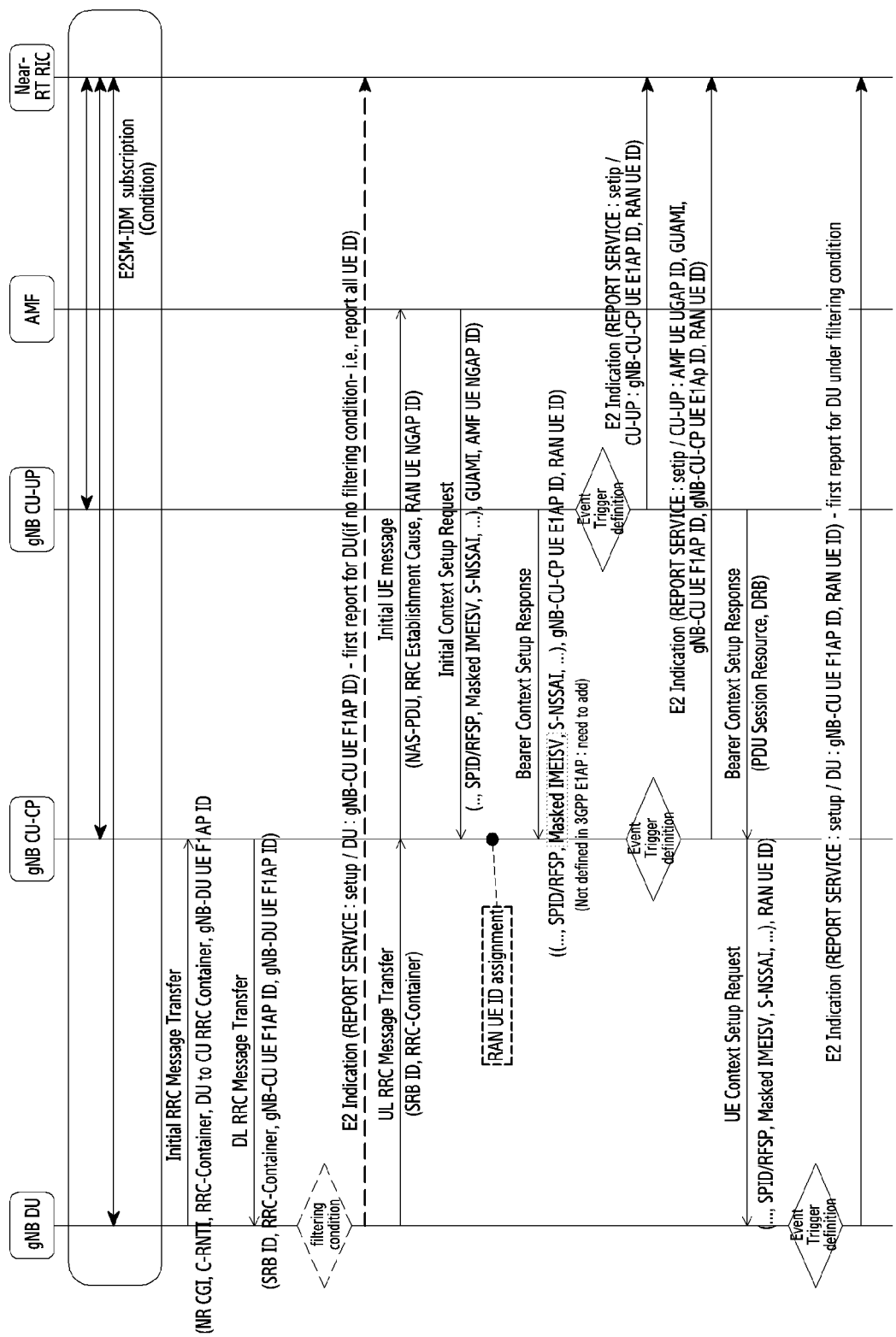
FIGS. 18A, 18B, and 18C are views illustrating examples of signaling of transmitting an E2 indication to a call setup according to various embodiments of the disclosure.
Figure 18B:
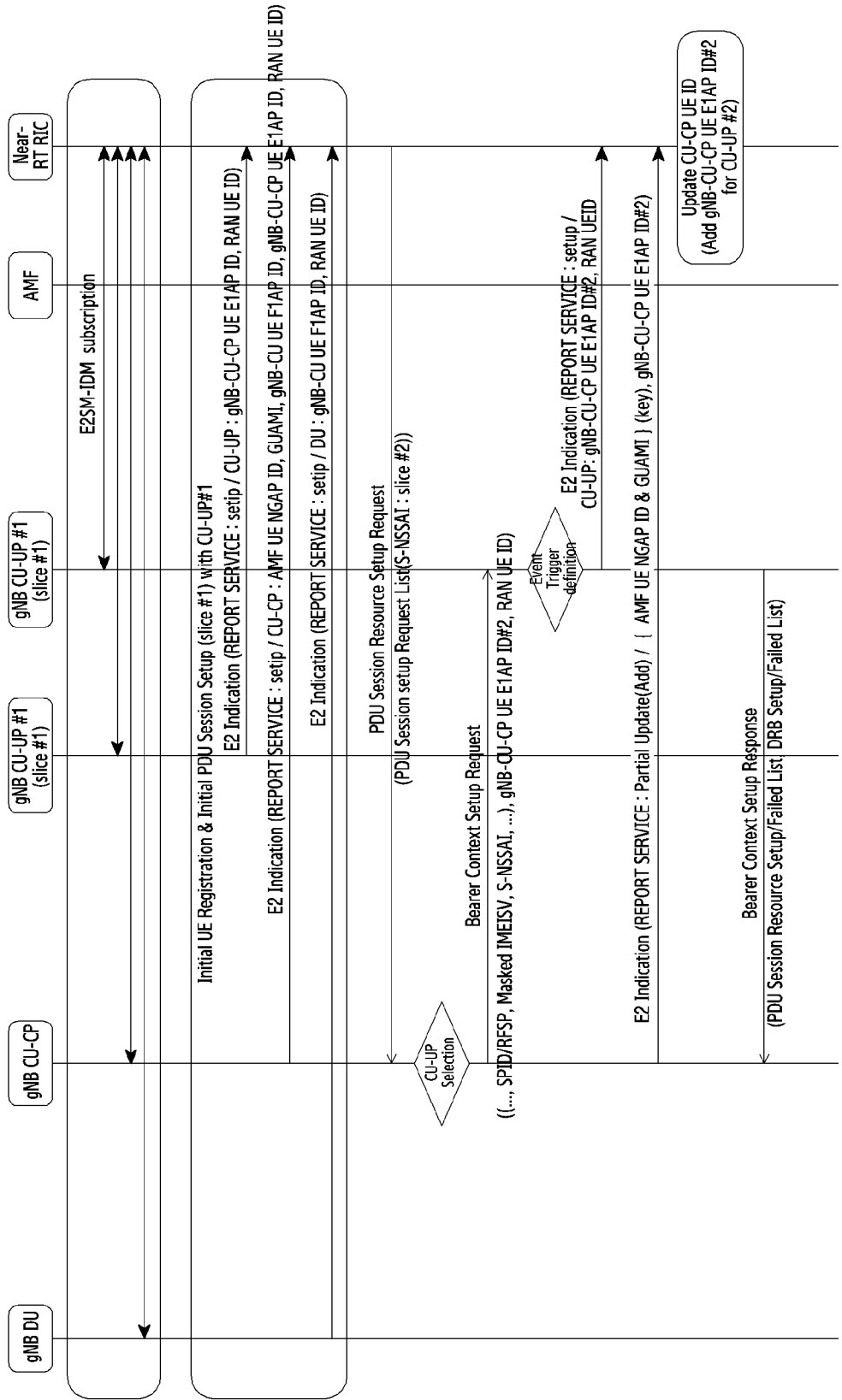
Figure 18C:
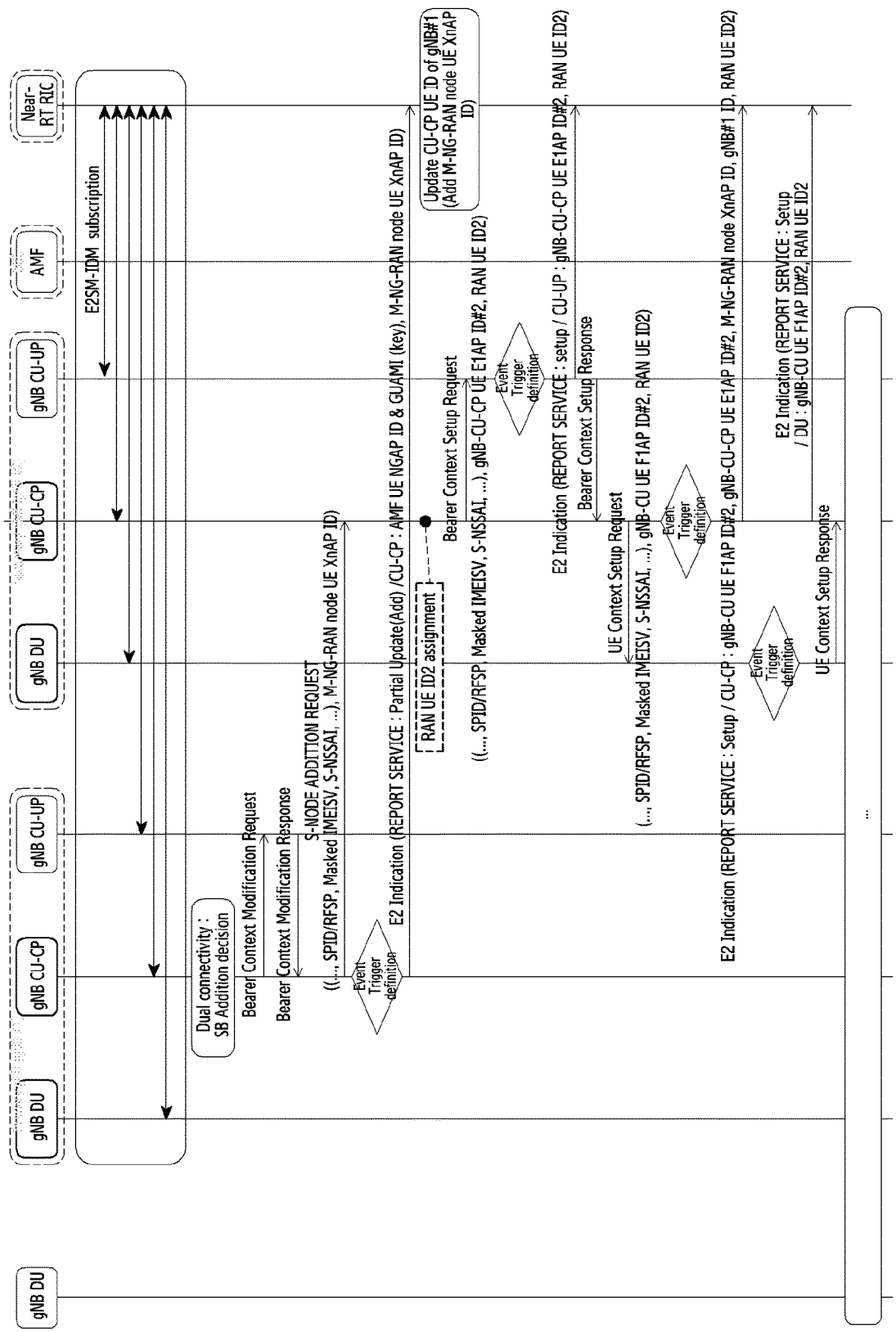

FIGS. 18A, 18B, and 18C illustrate examples of signaling of transmitting an E2 indication for a call setup according to various embodiments of the disclosure.

Referring to FIG. 18A, a UE ID report operation at the time of a call setup is illustrated. In the corresponding procedure, a DU may receive a DL RRC Message Transfer from a gNB CU-CP in response to an Initial UL RRC Message Transfer. The DL RRC Message Transfer may include a gNB-CU UE FLAP ID. The DU may transmit the gNB-CU UE F1AP ID to a RIC. A time at which the DL RRC Message Transfer is received is a time at which a UE ID is obtained for the first time from the point of view of the gNB-DU. However, at this time, the DU does not still know an SPID/RFSP of a corresponding terminal or Masked IMEISV, S-NSSAI. Accordingly, if the DU is limited to reporting only when the UE ID report condition includes a corresponding factor, the DU may postpone reporting the UE ID by the E2 indication until a UE Context Setup Request is received for the first time, and then may report.

The CU-CP may report the UE ID by the E2 indication after obtaining an AMF UE NGAP ID for the first time. The corresponding time may be a time at which an Initial Context Setup Request is received, but, when the AMF UE NGAP ID is obtained for the first time through DL NAS Transfer, the CU-CP may receive the Initial Context Setup Request as described above regarding the DU, may identify a relevant parameter, and may postpone the UE ID Report operation until an initial message for identifying a condition is received. Thereafter, if the condition is satisfied, the CU-CP may report the UE IE to the Near-RT RIC.

According to embodiments of the disclosure, since the gNB CU-CP is a gNB-CU UE FLAP ID, a gNB-CU-CP UE E1AP ID, the gNB CU-CP may include the same and may transmit the E2 indication to the RIC. In addition, the gNB CU-CP is connected with an AMF. The gNB CU-CP may transmit an AMF UE NGAP ID, which is a UE ID managed at the AMF, and a GUAMI which is the AMF, to the RIC.

The CU-UP may obtain an initial gNB-CU-CP UE E1AP ID for the first time when receiving a Bearer Context Setup Request. Since an additional parameter is also obtained at the corresponding time, the CU-CP may report the UE ID through the E2 indication message after the corresponding time.

According to an additional embodiment, each E2 node may further include a RAN UE ID, and may report the same to the RIC. The RAN UE ID may be generated by the gNB CU-CP. The gNB CU-CP may share the RAN UE ID by transmitting the RAN UE ID to the gNB CU-CP and the gNB DU. Thereafter, the gNB CU-CP may report a RAN UE IE to the RIC, in addition to an access and mobility management function (AMF) UE NGAP ID, a globally unique AMF ID (GUAMI), a gNB-CU UE F1AP ID, a gNB-CU-CP UE E1AP ID. The gNB CU-UP may report the RAN UE IE to the RIC in addition to a gNB-CU-CP UE E1AP ID. The gNB DU may report the RAN UE IE in addition to a gNB CU F1AP ID.

Referring to FIG. 18B, a procedure of setting an additional PDU SESSION for separate CU-UP #2 when a call setup is established first and one PDU SESSION is pre-set is illustrated. In this case, since an E1AP logical connection is generated for the first time, a CU-UP may report that a UE ID is set up through a typical E2 identification procedure. However, since an E1AP link is additionally set up in the case of the CU-CP, the CU-CP does not need to report what has been already reported redundantly. Accordingly, the gNB CU-CP may update the UE ID of the RIC by additionally transmitting only added gNB-CU-CP UE E1AP ID #2, in addition to an AMF UE NGAP ID which may serve as a key. According to an embodiment, a gNB CU-CP may update the UE ID to the RIC by using message format 3-1 of FIGS. 17BX, 17BY and 17CX and 17CY or message format 3-2 of FIGS. 17AX and 17AY, 17BX and 17BY, 17CX and 17CY.

Referring to FIG. 18C, addition of an SN gNB by a dual connectivity procedure after a call setup is illustrated. When SN Addition is performed through Dual Connectivity in the CU-CP of MN gNB, an M-NG-RAN node UE XnAP ID is transmitted through an XnAP S-NODE ADDITION REQUEST message. At the corresponding time, since a DC is set in the MN CU-CP, the MN CU-CP may transmit an AMF UE NGAP ID, which is its own key ID, and an added M-NG_RAN node UE XnAP ID through an E2 identification, and a near-RT RIC may receive the same and may update. Thereafter, the CU-CP of the SN gNB may perform a call setup within its own node. The CU-CP of the SN gNB may transmit, to the near-RT RIC, an ID that is generated for F1AP logical connection and E1AP logical connection generated in this process, an M-NG-RAN node UE XnAP ID specifying itself, and its own gNB ID. This is because a Master node is used as a higher node of the CU-CP of the SN gNB or a node serving as a Key. The DU and the CU-UP receive an F1AP UE Context Setup Request, E1AP Bearer Context Setup Request, respectively, and may report a corresponding UE ID to the near-RT RIC through the E2 Indication after logical connection is generated for the first time and a relevant AP ID is received.

Figure 19A:
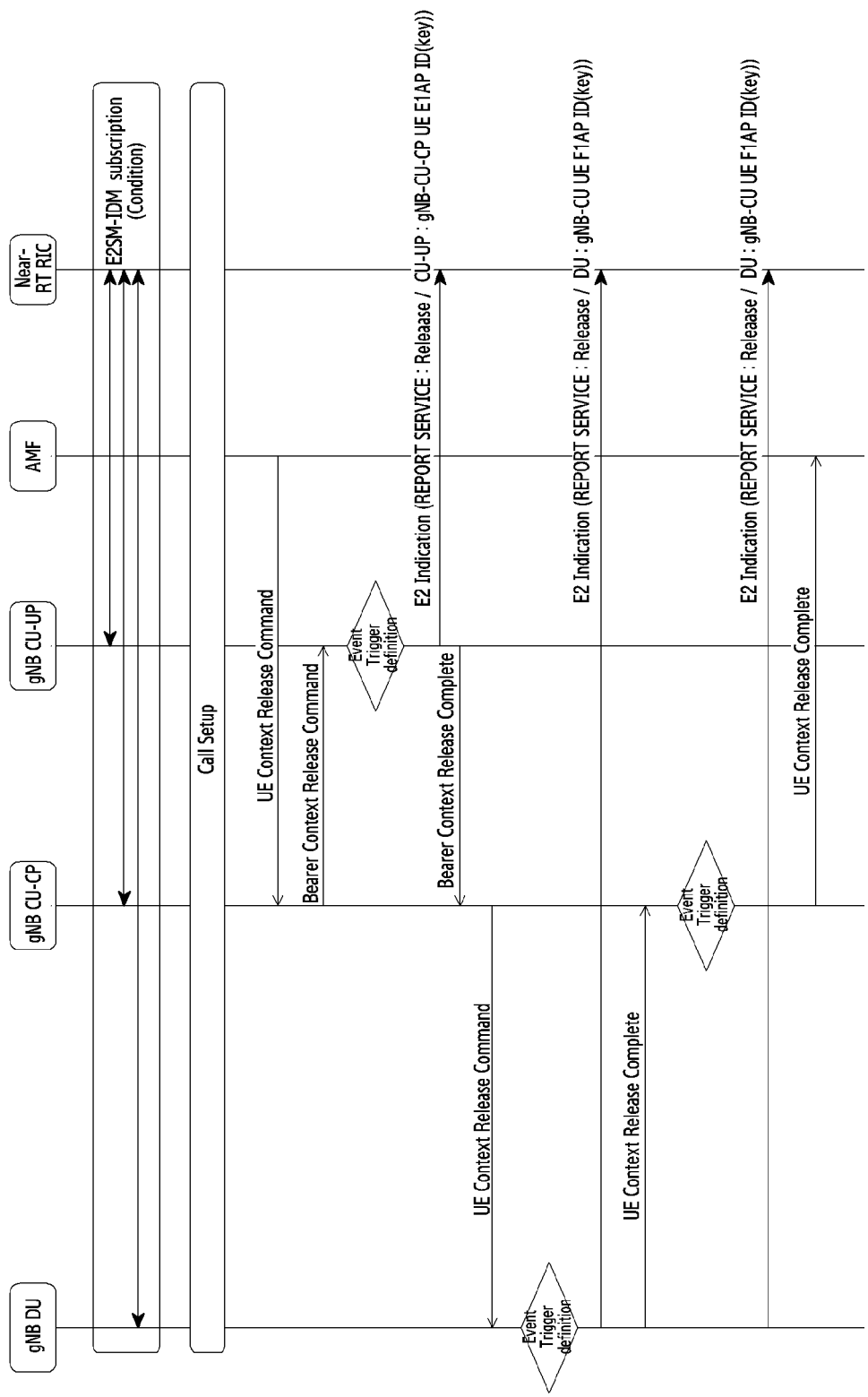
FIGS. 19A, 19B, and 19C are views illustrating examples of signaling of transmitting an E2 indication according to a call release according to various embodiments of the disclosure.
Figure 19B:
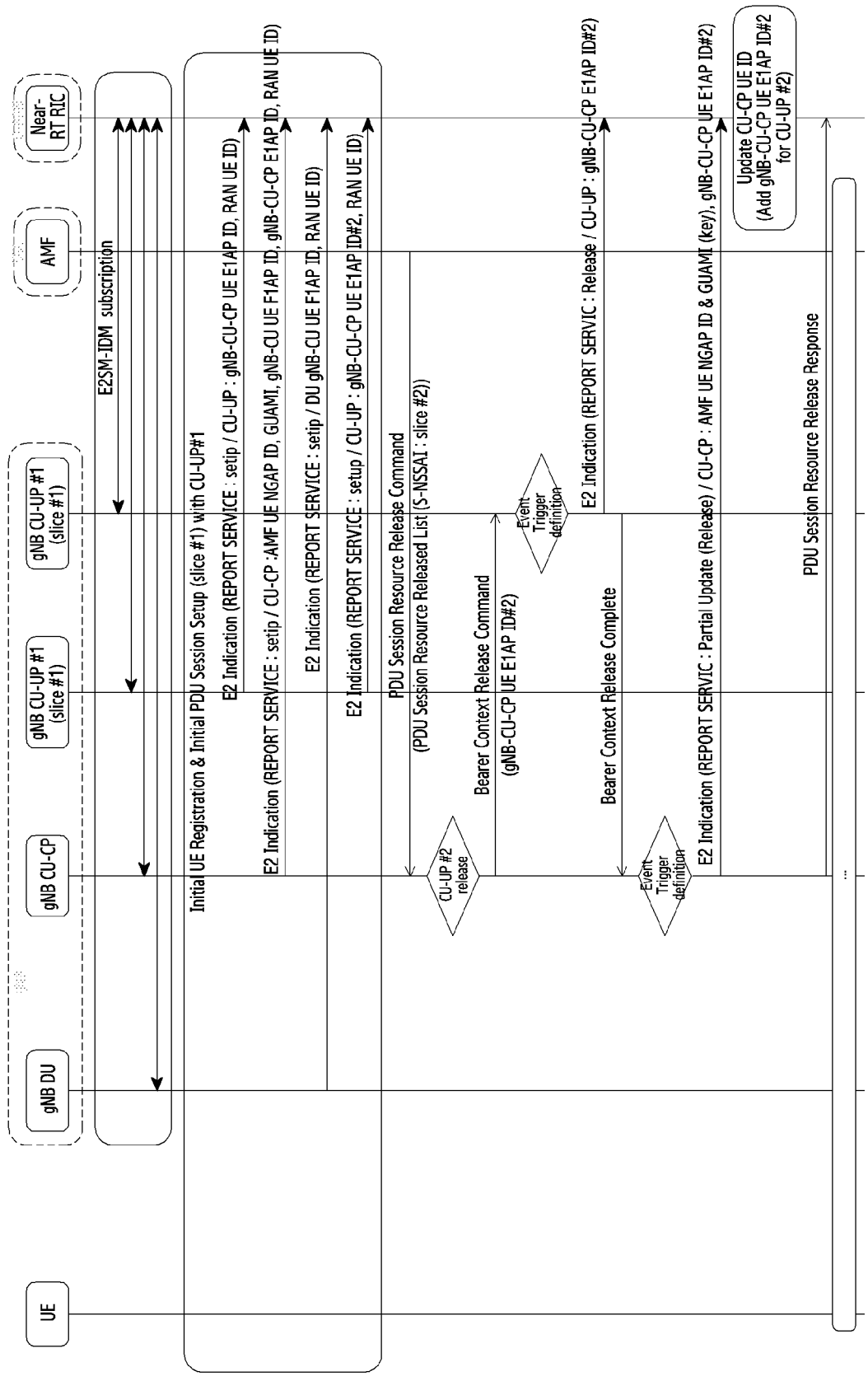
Figure 19C:
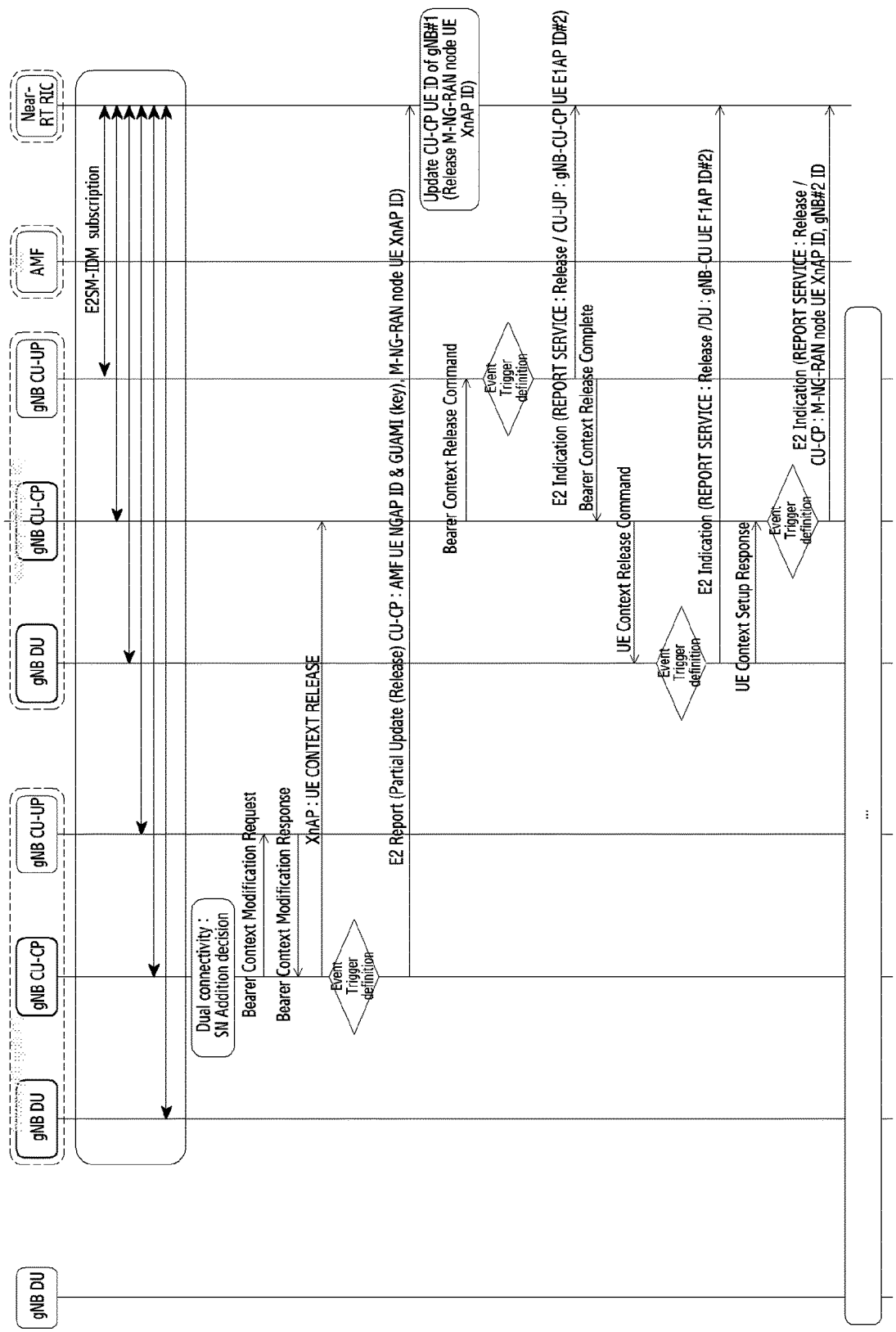

FIGS. 19A, 19B, and 19C illustrate examples of signaling of transmitting an E2 indication according to a call release according to various embodiments of the disclosure. A procedure of releasing a UE ID according to a call release is illustrated in FIGS. 19A to 19C. Typically, this procedure is performed after an AP ID assigned to each node is recovered, and according to circumstances, the call release may be triggered when a UE ID report condition is not satisfied according circumstances.

Referring to FIG. 19A, a DU may transmit an E2 indication to a near RT RIC after the DU receives a UE Context Release Command, after a gNB CU-CP receives a UE Context Release Complete or a Bearer Context Release Complete from the DU and a CU-UP, respectively, or a relevant timer times out and a call is released, or after the DU reports a UE Context Release Complete to an AMF and NGAP logical connection is disconnected. The corresponding E2 indication may be configured to indicate that the corresponding UE ID is released. In this case, even when releasing is processed only by transmitting an AMF UE NGAP ID corresponding to a key of the UE ID, there may not be a problem in binding portions related to other UE IDs of the CU-CP and deleting the same. Therefore, reporting only the AMF UE NGAP ID which is the key ID is enough for efficiency.

This is because a UE ID which is managed by a higher node is related to lower nodes connected with the higher node. Even when only a corresponding UE ID is transmitted, all UE IDs managed by one or more lower nodes may be identified. That is, embodiments of the disclosure have features of using a UE ID of a higher node of a specific E2 node as a Key UE ID of the specific E2 node. A principle of managing higher nodes and lower nodes will be described in detail through FIG. 21.

Likewise, a CU-UP may report a UE ID release to the Near-RT RI through an E2 indication after receiving a Bearer Context Release Command and restoring an E1AP ID.

FIG. 19B illustrates a case where E1 AP logical connection between specific CU-UP #2 and CU-CP is disconnected through a PDU SESSION Release.

Referring to FIG. 19B, the CU-UP may report a UE ID release through an E2 indication, but the CU-CP may delete one of various E1 links, and accordingly, the CU-CP may transmit information indicating that only gNB-CU-CP UE E1AP ID #2 for E1 link which is changed through partial update is deleted, through the E2 Indication message. At the corresponding time, the other part of the UE ID of the CU-CP is not changed. Accordingly, the E2 indication is transmitted by using only the AMF UE NGAP ID corresponding to a key, rather than using all IDs, so that efficiency is maximized.

Referring to FIG. 19C, a case where an NR-DC is released and a UE Context Release is transmitted through XnAP is illustrated. In this case, since connection with an SN is disconnected, a CU-CP of AN MN may perform a partial update operation to delete an M-NG-RAN node UE XnAP ID through an E2 indication. Since a CU-CP, DU, CU-UP of another SN perform operations resulting from a call release, each E2 node may report a release of the UE ID through an E2 indication when a relevant release is performed.

Figure 20A:
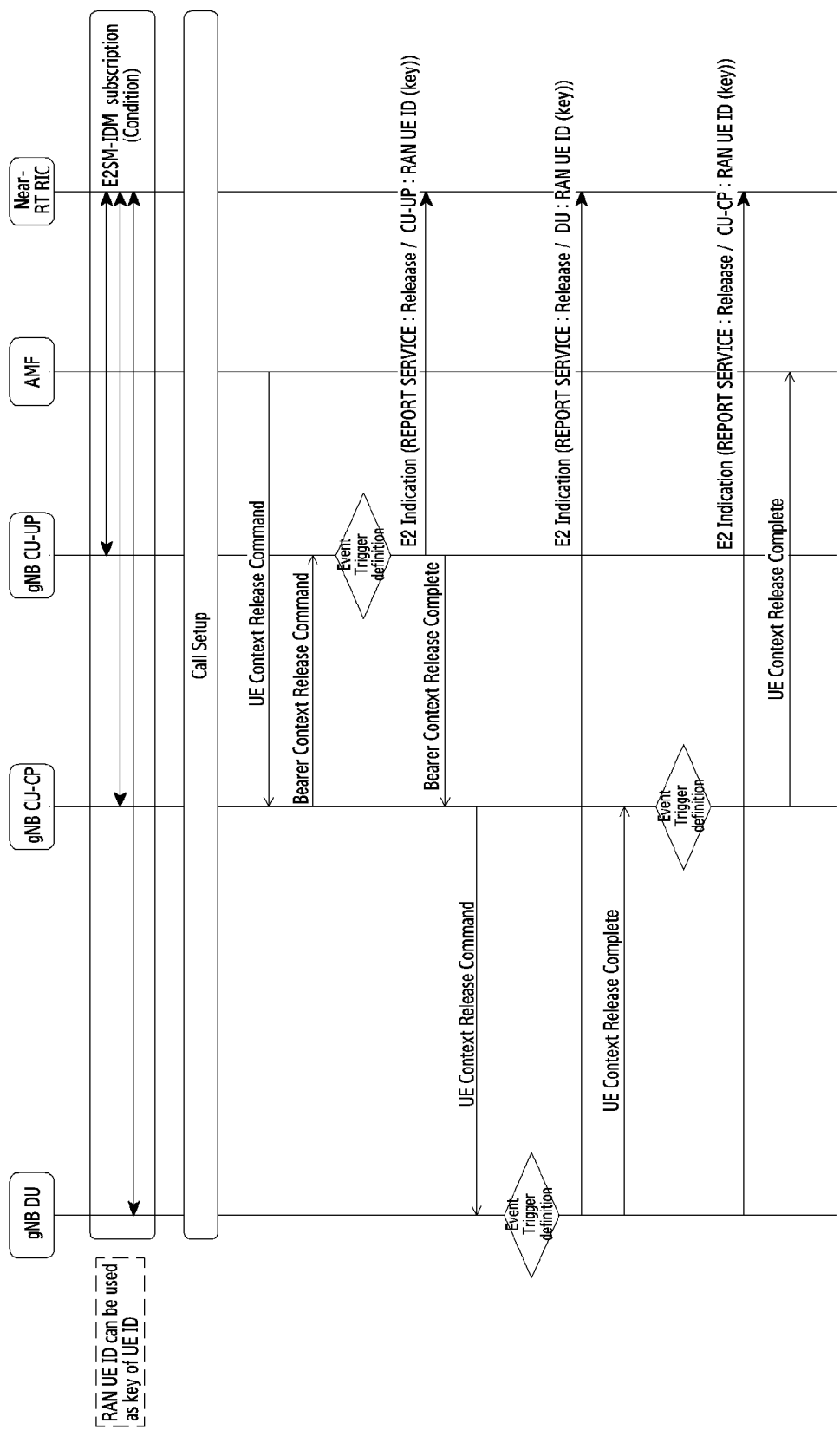
FIGS. 20A, 20B, and 20C are views illustrating examples of signaling of transmitting an E2 indication through a RAN UE ID according to various embodiments of the disclosure.
Figure 20B:
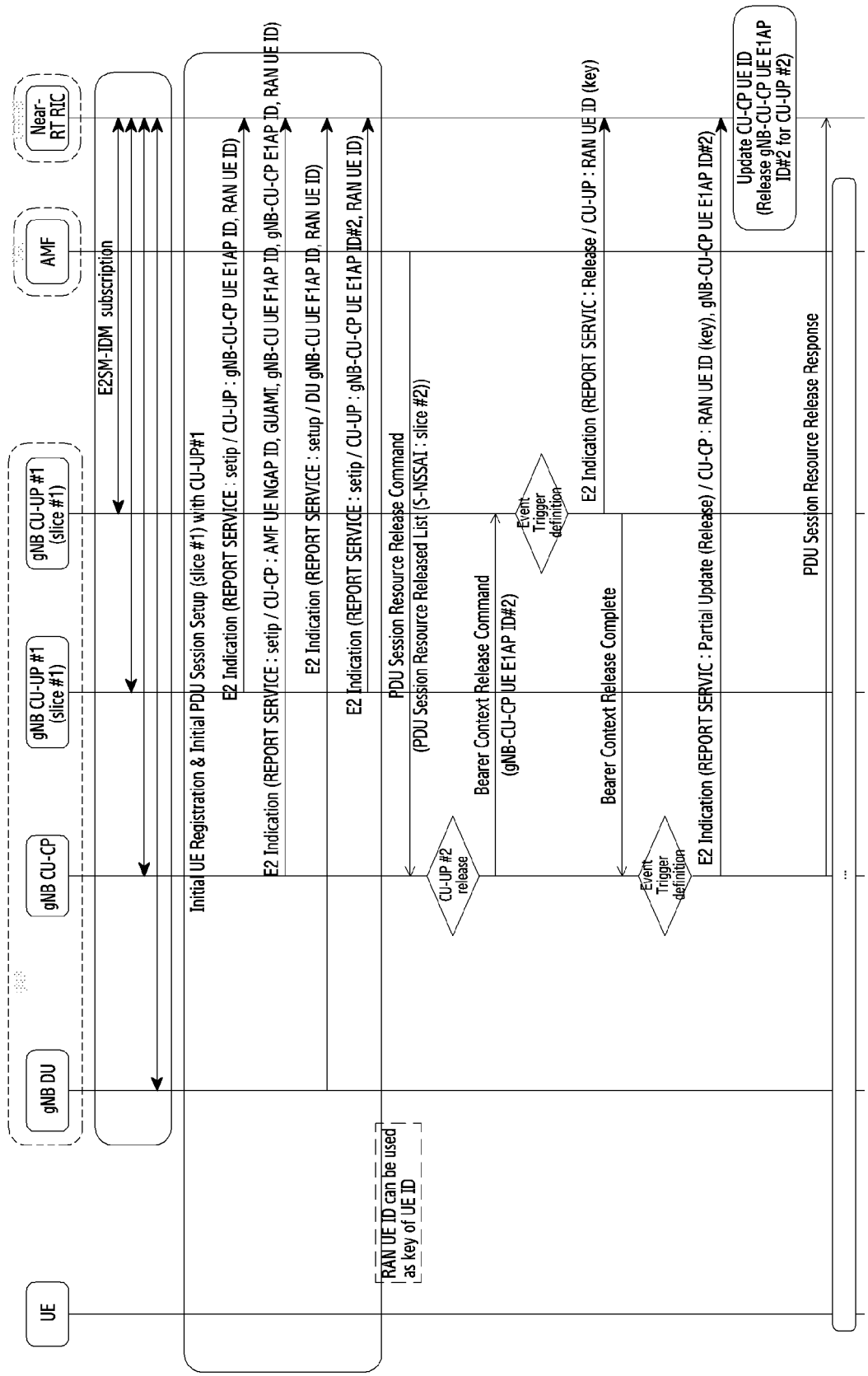
Figure 20C:
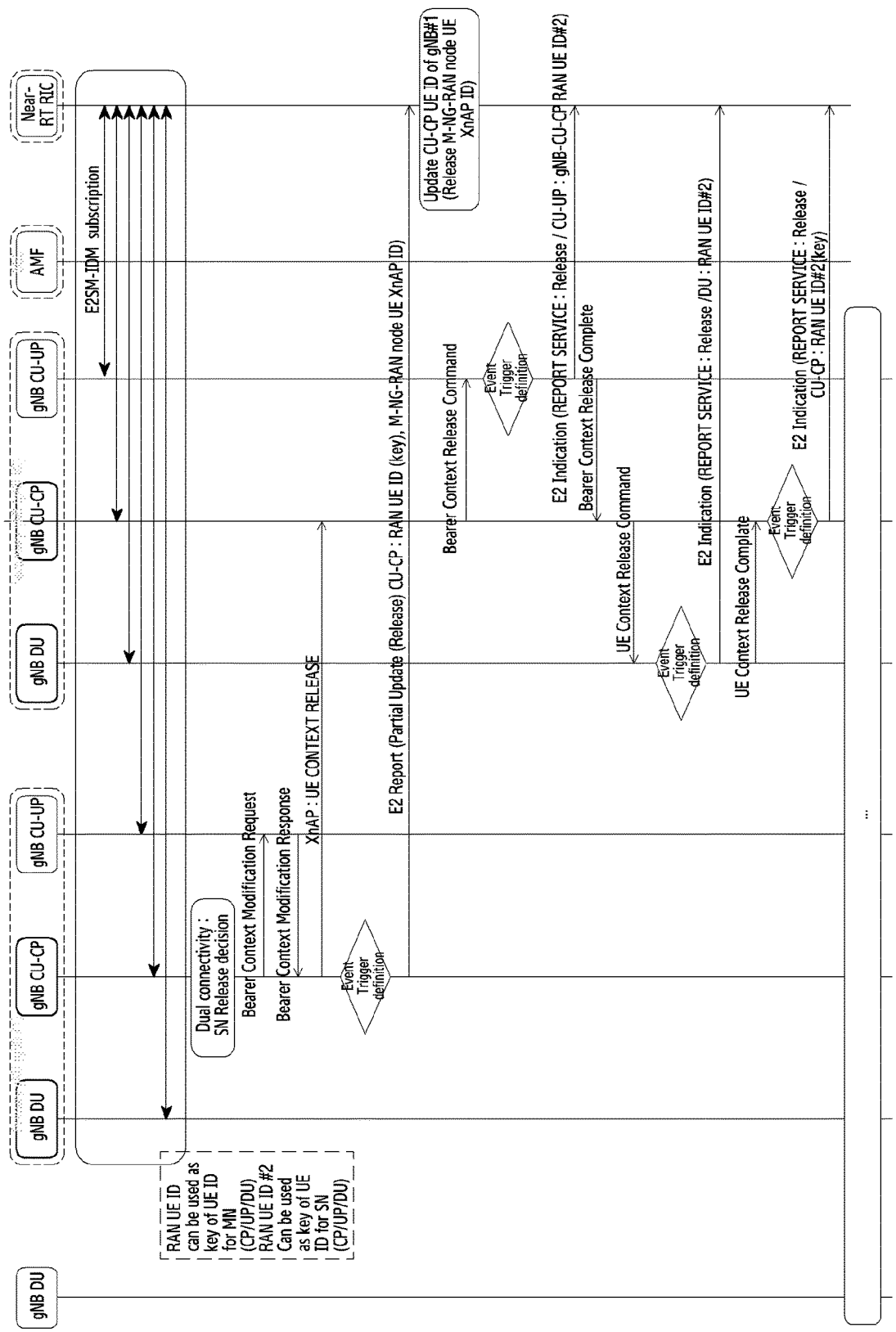

FIGS. 20A to 20C illustrate examples of signaling of transmitting an E2 indication through a RAN UE ID according to various embodiments of the disclosure. A gNB-CU-CP may generate a RAN UE ID and may share the same with another E2 node (for example, gNB-CU-UP, gNB-DU). By using the RAN UE ID as a key, efficiency of message transmission may be enhanced. FIGS. 20A to 20C illustrate an operation of using a key ID as a RAN UE ID when a call release, an E1 link release with the CU-UP caused by a PDU Session Release, and an SN CU-CP, DU, CU-UP release according to an SgNB release caused by an NR-DC release are performed as described above in FIGS. 19A to 19C, and other operation procedures are the same. However, since the RAN UE ID may not be transmitted through an I/F (X2AP, W1AP) related to eNB, the RAN UE ID is excluded as a UE ID element although this is not specifically illustrated in the flows of the drawings. Accordingly, when there is no RAN UE ID, a release procedure or a partial update procedure using the RAN UE ID as a key may not be used.

Figure 21:
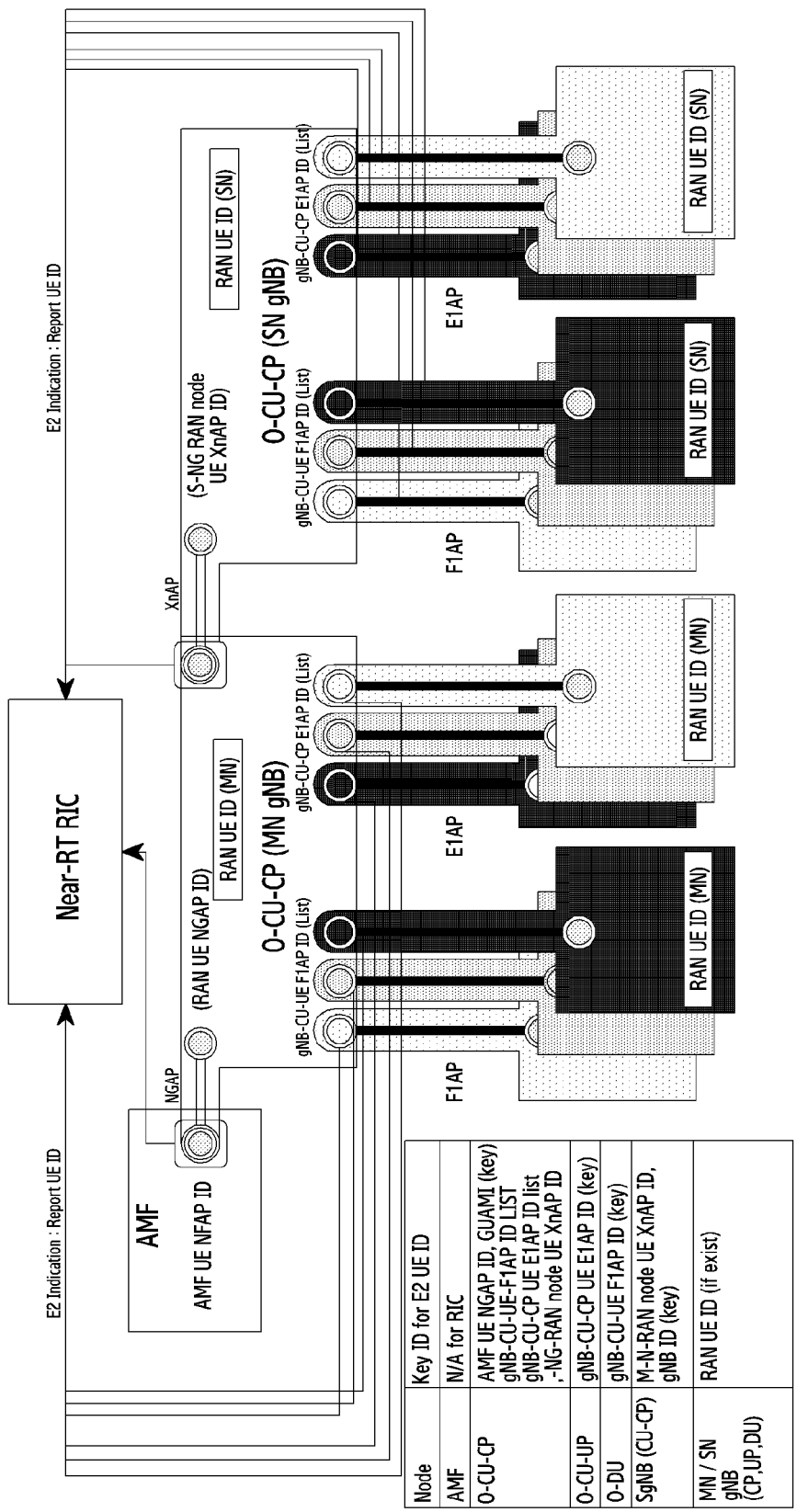
FIG. 21 is a view illustrating a principle of a design of a UE ID structure according to an embodiment of the disclosure.

FIG. 21 illustrates a principle of a design of a UE ID structure according to an embodiment of the disclosure. The UE ID structure according to embodiments of the disclosure indicates a correlation between UE IDs of respective E2 nodes according to a definition of the UE ID managed by each E2 node. The E2 node may be an O-DU, an O-CU, an O-CU-UP, or an O-CU-UP. This illustrates a deployment of a disaggregated base station of gNB, and according to another embodiment, the E2 node may include a base station such as eNB, ng-eNB, en-gNB.

The UE ID structure according to embodiments of the disclosure may provide high efficiency of E2 indication transmission through a key UE ID defined in the E2 node. That is, in setting or releasing a call, efficiency of E2 indication transmission may be enhanced by transmitting a Key UE ID when possible, rather than reporting all UE IDs of respective E2 nodes to a RIC. The Near RT RIC may efficiently acquire desired information by acquiring the Key UE ID. In addition, a Key UE ID transmission method may be supplemented by acquiring information regarding an updated UE ID separately or through the same field, in addition to the Key UE ID.

According to embodiments of the disclosure, the O-CU-CP of an MN may be connected with an AMF through an NGAP interface. The O-CU-CP of the MN may use a RAN UE NGAP ID as a Key UE ID.

According to embodiments of the disclosure, the O-DU of the MN may be connected with the O-CU-CP through an FLAP interface. The O-DU of the MN may use a RAN UE F1AP ID as a Key UE ID. According to an embodiment, since at least one O-DU may be connected with the O-CU-CP, the RAN UE F1AP ID may be managed in the form of a list. For example, the list may include one or a plurality of RAN UE F1AP IDs.

According to embodiments of the disclosure, the O-CU-UP of the MN may be connected with the O-CU-CP through the E1AP interface. The O-CU-UP of the MN may use the RAN UE E1AP ID as a Key UE ID. According to an embodiment, since at least one O-CU-UP may be connected with the O-CU-CP, the RAN UE F1AP ID may be managed in the form of a list. For example, the list may include one or a plurality of RAN UE F1AP IDs.

According to embodiments of the disclosure, when dual connectivity is set, an SN may be connected with the MN. A higher node of the SN may be the MN. The O-CU-CP of the SN may be connected with the O-CU-CP of the MN through an XnAP interface. The O-CU-CP of the SN may use an M-NG RAN node UE XnAP ID as a Key UE ID. On the other hand, when dual connectivity is not set, the MN may refer to gNB (or gNB-CU/gNB-DU).

In some embodiments, a RAN UE ID generated at the O-CU-CP may be used as a Key UE ID according to embodiments of the disclosure instead of a UE ID managed in each E2 node. That is, the RAN UE ID generated by the O-CU-CP may be transmitted to the O-DU, O-CU-UP which are lower nodes. The RAN UE ID may function as a key ID for each E2 node. Each E2 node may report the RAN UE ID to the Near RT RIC. However, since the RAN UE ID is not transmitted on an XnAP or X2AP interface, the MN and the SN may include independent UE IDs in a situation like dual connectivity. That is, referring to FIG. 21, the O-CU-CP, O-CU-UP, O-D of the MN may use the RAN UE ID regarding each MN (that is, the UE ID generated by the O-CU-CP of the MN) as a Key UE ID, and the O-CU-CP, O-CU-UP, O-D of the SN may use the RAN UE ID regarding each SN (that is, the UE ID generated by the O-CU-CP of the SN) as a Key UE ID.

The Key UE ID and the management UE ID according to the above-described embodiments may be summarized as shown in table 2 presented below:

TABLE 2

| Node | Key ID for E2 UE ID |
|---|---|
| AMF | N/A for RIC |
| O-CU-CP | AMF UE NGAP ID, GUAMI (key) |
| | gNB-CU UE F1AP ID list |
| | gNB-CU-CP UE E1AP ID list |
| | M-NG-RAN node UE XnAP ID |
| O-CU-UP | gNB-CU-CP UE E1AP ID (key) |
| O-DU | gNB-CU UE F1AP ID (key) |
| SgNB (CU-CP) | M-NG-RAN node UE XnAP ID, gNB ID (key) |
| MN/SN gNB (CP, UP, DU) | RAN UE ID (if exist) |

According to various embodiments of the disclosure, an IPC cost may be reduced under RRM control of the RIC. In particular, when the DU/CU/RIC are located in the same environment, a cost for a message relay may be reduced. The RIC performs all operations except for message transmission, so that a compatibility problem in management between vendors may be solved. In addition, an intelligent function of the RIC may be upgraded to substitute a specific function between the DU, CU-Ups.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by an E2 node, the method comprising:
   receiving a subscription request message from a radio access network (RAN) intelligent controller (RIC);
   transmitting a subscription response message to the RIC; and
   when an event occurs in response to the subscription response message, transmitting a RIC indication message to the RIC,
   wherein the RIC indication message comprises a key user equipment (UE) identifier (ID) which is managed at a higher node associated with the E2 node, and
   wherein the key UE ID is used to identify one or more other UE IDs associated with the E2 node.

2. The method of claim 1,
   wherein, when the E2 node is a central unit (CU)-control plane (CP), the higher node is an access and mobility management function (AMF) to which the CU-CP is connected,
   wherein, when the E2 node is a CU-user plane (UP), the higher node is a CU-CP to which the CU-UP is connected, and
   wherein, when the E2 node is a distributed unit (DU), the higher node is the CU-CP to which the DU is connected.

3. The method of claim 1, wherein the RIC indication message further comprises an information element (IE) indicating whether the E2 node is added or released.

4. The method of claim 1, wherein the RIC indication message is used in a call setup procedure or a call release procedure.

5. The method of claim 1,
   wherein the RIC indication message further comprises a key UE ID structure and an update UE ID part, and
   wherein the key UE ID structure includes the key UE ID, and the update UE ID part indicates only changed information to the RIC.

6. A method performed by a radio access network (RAN) intelligent controller (RIC), the method comprising:
   transmitting a subscription request message to an E2 node;
   receiving a subscription response message from the E2 node; and
   receiving, from the E2 node, a RIC indication message,
   wherein the RIC indication message comprises a key user equipment (UE) identifier (ID) which is managed at a higher node associated with the E2 node, and wherein the key UE ID is used by the RIC to identify one or more other UE IDs associated with the E2 node.

7. The method of claim 6,
wherein, when the E2 node is a central unit (CU)-control plane (CP), the higher node is an access and mobility management function (AMF) to which the CU-CP is connected,
wherein, when the E2 node is a CU-user plane (UP), the higher node is a CU-CP to which the CU-UP is connected, and
wherein, when the E2 node is a distributed unit (DU), the higher node is the CU-CP to which the DU is connected.

8. The method of claim 6, wherein the RIC indication message further comprises an information element (IE) indicating whether the E2 node is added or released.

9. The method of claim 6, wherein the RIC indication message is used in a call setup procedure or a call release procedure.

10. The method of claim 6,
wherein the RIC indication message further comprises a key UE ID structure and an update UE ID part, and
wherein the key UE ID structure includes the key UE ID, and the update UE ID part indicates only changed information to the RIC.

11. An apparatus for performing one or more operations of an E2 node, the apparatus comprising:
at least one transceiver; and
at least one processor,
wherein the at least one processor is configured to control the at least one transceiver to:
receive a subscription request message from a radio access network (RAN) intelligent controller (RIC),
transmit a subscription response message to the RIC, and
when an event occurs in response to the subscription response message, transmit a RIC indication message to the RIC, and
wherein the RIC indication message comprises a key user equipment (UE) identifier (ID) which is managed at a higher node associated with the E2 node, and
wherein the key UE ID is used to identify one or more other UE IDs associated with the E2 node.

12. The apparatus of claim 11,
wherein, when the E2 node is a central unit (CU)-control plane (CP), the higher node is an access and mobility management function (AMF) to which the CU-CP is connected,
wherein, when the E2 node is a CU-user plane (UP), the higher node is a CU-CP to which the CU-UP is connected, and
wherein, when the E2 node is a distributed unit (DU), the higher node is the CU-CP to which the DU is connected.

13. The apparatus of claim 11, wherein the RIC indication message further comprises an information element (IE) indicating whether the E2 node is added or released.

14. The apparatus of claim 11, wherein the RIC indication message is used in a call setup procedure or a call release procedure.

15. The apparatus of claim 11,
wherein the RIC indication message further comprises a key UE ID structure and an update UE ID part, and
wherein the key UE ID structure includes the key UE ID, and the update UE ID part indicates only changed information to the RIC.

16. An apparatus for performing one or more operations of a radio access network (RAN) intelligent controller (RIC), the apparatus comprising:
at least one transceiver; and
at least one processor,
wherein the at least one processor is configured to control the at least one transceiver to:
transmit a subscription request message to an E2 node,
receive a subscription response message from the E2 node, and
receive, from the E2 node, a RIC indication message which is transmitted when an event occurs in response to the subscription response message, and
wherein the RIC indication message comprises a key user equipment (UE) identifier (ID) which is managed at a higher node associated with the E2 node, and
wherein the key UE ID is used by the RIC to identify one or more other UE IDs associated with the E2 node.

17. The apparatus of claim 16,
wherein, when the E2 node is a central unit (CU)-control plane (CP), the higher node is an access and mobility management function (AMF) to which the CU-CP is connected,
wherein, when the E2 node is a CU-user plane (UP), the higher node is a CU-CP to which the CU-UP is connected, and
wherein, when the E2 node is a distributed unit (DU), the higher node is the CU-CP to which the DU is connected.

18. The apparatus of claim 16, wherein the RIC indication message further comprises an information element (IE) indicating whether the E2 node is added or released.

19. The apparatus of claim 16, wherein the RIC indication is used in a call setup procedure or a call release procedure.

20. The apparatus of claim 16,
wherein the RIC indication message further comprises a key UE ID structure and an update UE ID part, and
wherein the key UE ID structure includes the key UE ID, and the update UE ID part indicates only changed information to the RIC.

* * * * *